United States Patent [19]

Citta et al.

[11] Patent Number: 5,043,812
[45] Date of Patent: Aug. 27, 1991

[54] TV SIGNAL TRANSMISSION SYSTEMS AND METHODS

[75] Inventors: Richard W. Citta, Oak Park; Ronald B. Lee, Chicago, both of Ill.

[73] Assignee: Zenith Electronics Corporation, Glenview, Ill.

[21] Appl. No.: 566,784

[22] Filed: Aug. 13, 1990

Related U.S. Application Data

[63] Continuation of Ser. No. 238,956, Aug. 31, 1988, abandoned, which is a continuation-in-part of Ser. No. 176,893, Apr. 4, 1988, abandoned.

[51] Int. Cl.⁵ ............................................... H04N 7/04
[52] U.S. Cl. ..................................... 358/141; 358/147
[58] Field of Search ................. 358/141, 142, 146, 147

[56] References Cited

U.S. PATENT DOCUMENTS

| | | | |
|---|---|---|---|
| 2,225,741 | 12/1940 | Guanella | 358/141 |
| 2,266,194 | 12/1941 | Guanella | 178/5.8 |
| 2,543,037 | 2/1951 | Mayle | 178/7.5 |
| 2,850,574 | 9/1958 | Kretzmer | 179/15.5 |
| 2,881,427 | 5/1959 | Huber | 358/141 |
| 4,268,861 | 5/1981 | Schreiber et al. | 358/138 |
| 4,318,126 | 3/1982 | Sassler | 358/1441 |

FOREIGN PATENT DOCUMENTS

| | | | |
|---|---|---|---|
| 2613568 | 10/1988 | France | 358/141 |
| 507668 | 7/1930 | United Kingdom . | |

OTHER PUBLICATIONS

Hill, P. C. J., "Hybrid-Pulse Coding: Theoretical Assessment of System", BBC Research Report No. 1969/40.

Hill et al., "Hybrid-Pulse Coding: Experimental Assessment of System as Applied to Video Signals", BBC Research Report No. 1969/45.

Hill et al., "Hybrid-Pulse Coding: Experimental Equipment for Tests with Video Signals", BBC Research Report No. 1969/46.

Primary Examiner—James J. Groody
Assistant Examiner—David E. Harvey

[57] ABSTRACT

A hybrid television signal of less transmission power or better signal to noise performance is made up by removing low frequency analog components from the video signal, digitizing them and sending them as data in nonactive video portions of the transmitted signal. A two step hybridization process, with the first step removing the line averaged value of the video components of the video signal and the second step removing the remainder of the video components under 200 KHz, is described. Temporal filtering, signal pre-emphasis, compression, dispersal and double sideband suppressed carrier modulation about a centered carrier are disclosed for reducing peak signal amplitudes and for minimizing co-channel interference to and from NTSC signals. In an FM implementation, the benefits of the hybrid signal are realized as a reduction in bandwidth and consequent improved noise performance. The hybrid signal system is uniquely adapted to a high definition television signal in a limited frequency channel.

57 Claims, 14 Drawing Sheets

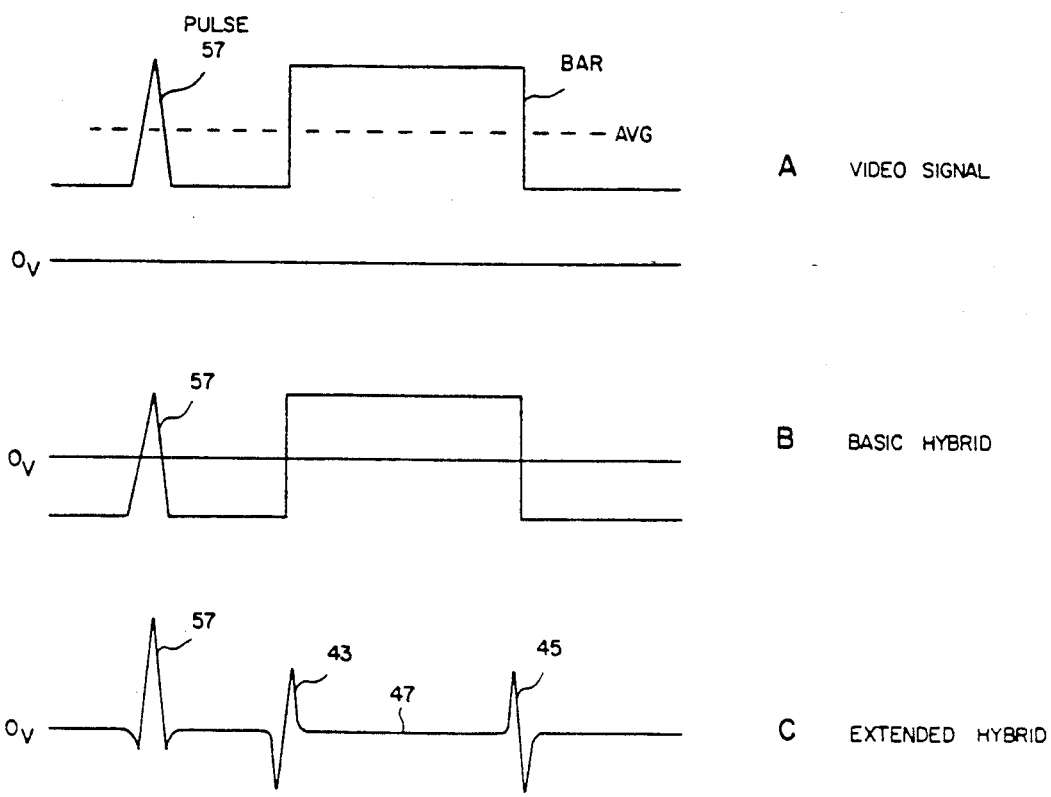
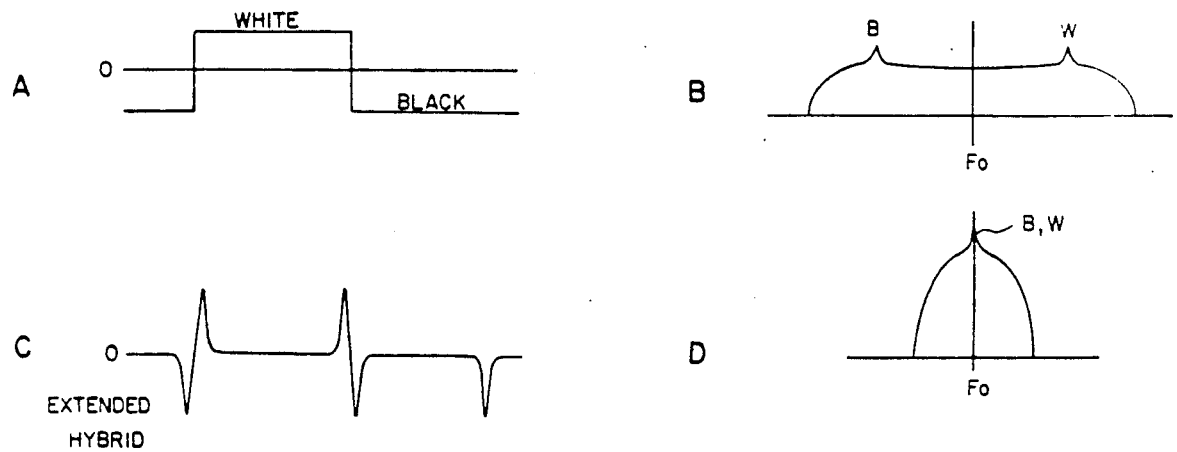

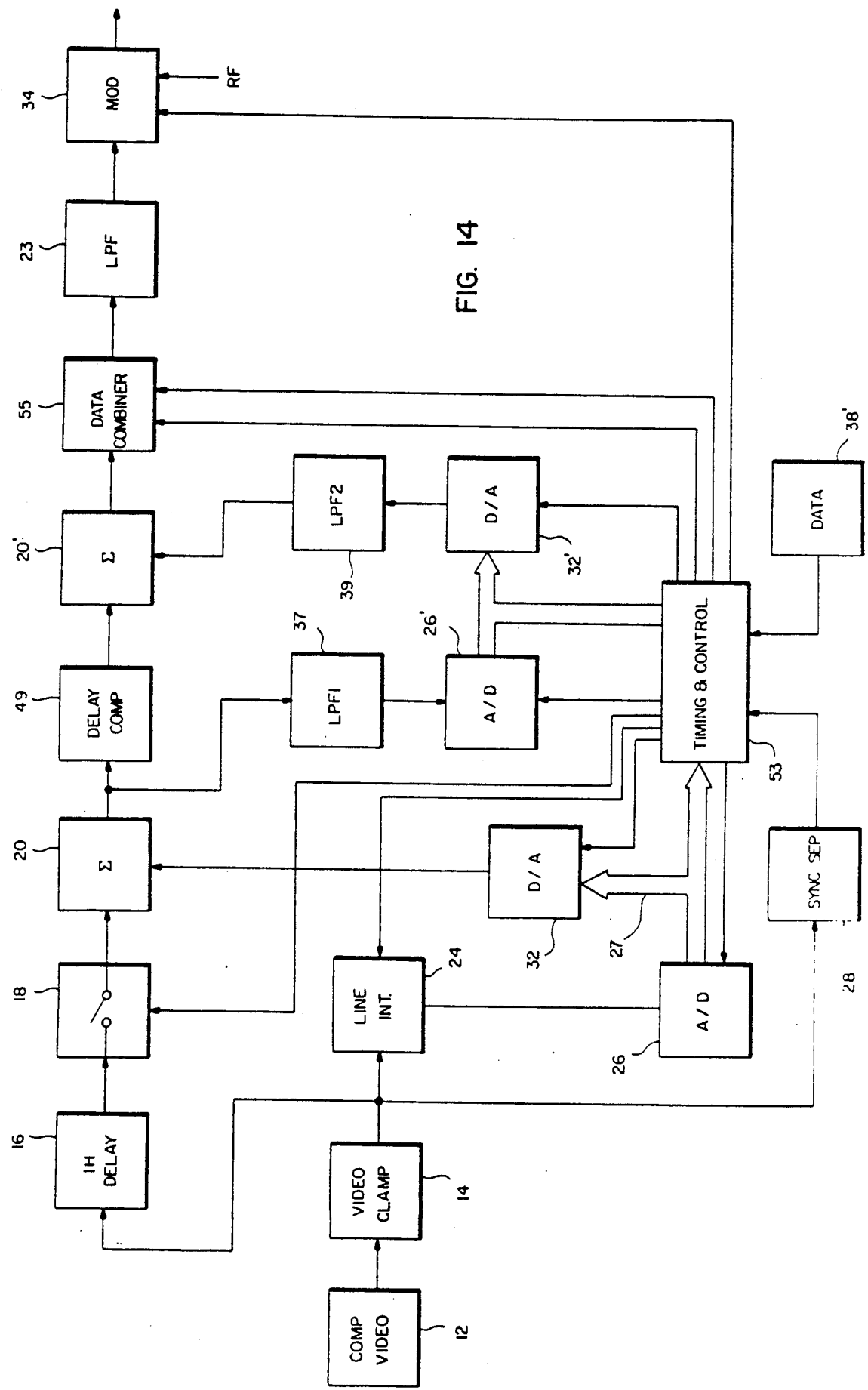

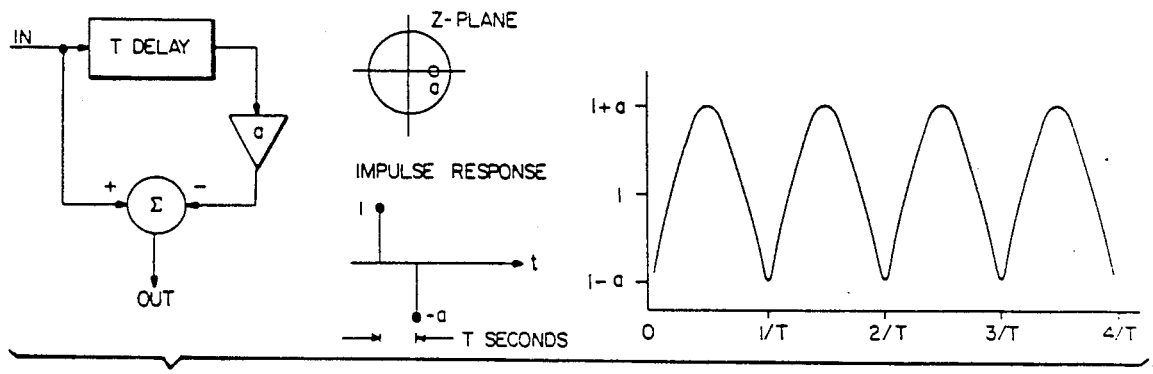
FIG. 17
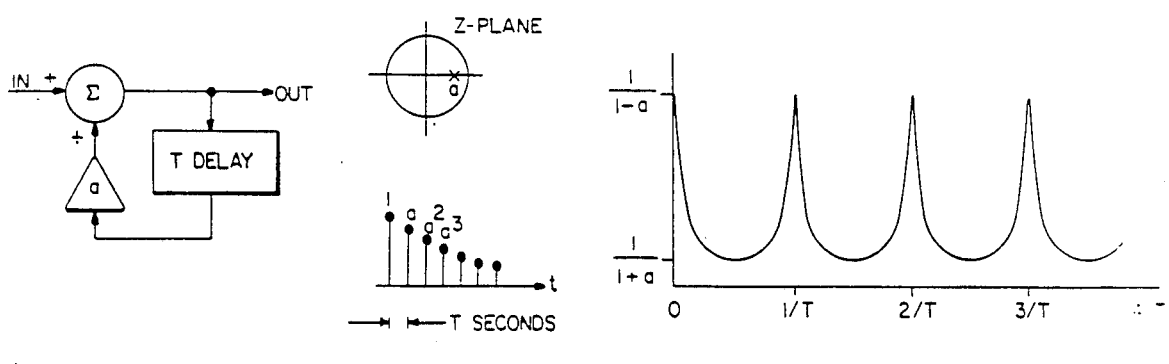
FIG. 18
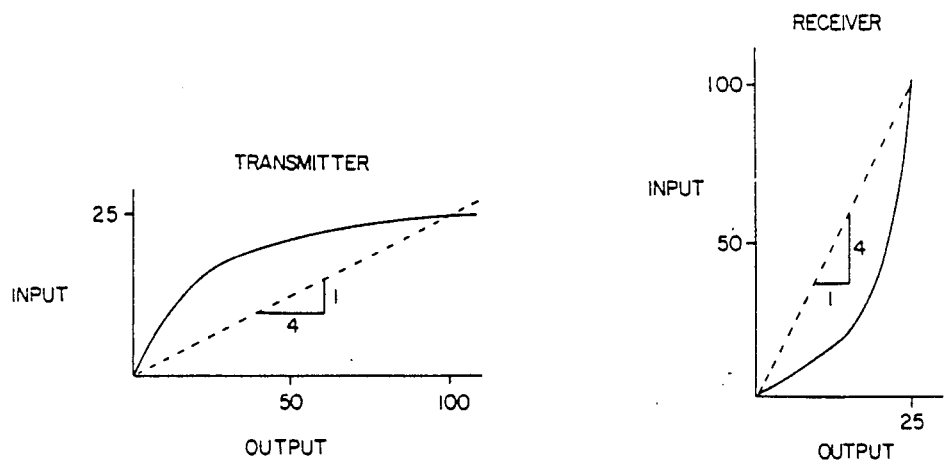
FIG. 19
FIG. 20

TV SIGNAL TRANSMISSION SYSTEMS AND METHODS

This application is a continuation of application Ser. No. 238,956, filed Aug. 31, 1988, now abandoned which is a continuation-in-part of application Ser. No. 176,893, filed Apr. 4, 1988, now abandoned.

BACKGROUND OF THE INVENTION AND PRIOR ART

This invention relates generally to television signal transmission systems and methods and specifically concerns a novel television transmission system of improved noise performance. In an amplitude modulation (AM) implementation of the invention, the enhanced signal to noise ratio of the transmitted signal may be converted, in whole or in part, to a substantial reduction in transmission power without discernible degradation in signal fidelity. In a frequency modulation (FM) implementation of the invention, the reduced bandwidth of the transmitted signal enables much improved signal to noise performance. The invention will also be seen to provide special benefits with regard to adjacent channel and co-channel interference problems with NTSC and other type television signal transmission and receiving systems. The improved transmission system will be seen to permit operation in or adjacent to NTSC television signal transmission areas without objectionable adjacent channel and co-channel interference, either into or from the NTSC channel. In its FM implementation, the invention will find ready application in connection with Direct Broadcast Satellite (DBS) transmission systems. This use will result in receiving dish antennas of significantly smaller diameter and trigger a rapid expansion in growth of satellite television receivers.

An NTSC television signal occupies a 6 MHz bandwidth and imposes significant transmission power demands. These power demands are directly related to the cost of operating the signal transmitter and reductions therein can yield very large cost savings. Also of great importance is the fact that cable television plants, especially those of older vintage, are restricted, in the number of channels they can handle, by the signal power handling capabilities of their amplifiers. It would be highly desirable to reduce the amount of signal power required to transmit television signals, thereby reducing transmitter operating costs and permitting a larger number of television channel signals to be handled by a cable plant of given power handling capability. The system of the invention achieves a marked reduction in the power required to transmit an AM television signal without discernible degradation of signal fidelity and therefore provides a solution to these needs of the prior art.

In its FM implementation, the system of the invention enables transmission with significantly less bandwidth since the deviation of the FM signal is minimized. The smaller bandwidth directly improves the signal to noise performance of the system, which improvement may be translated into smaller receiving antennas. Thus, the system of the invention will be seen to solve a longstanding problem in DBS transmission systems.

The inventive system has a number of important aspects. In accordance with a fundamental aspect of the invention, a television signal is configured such that the transmitted signal is a "hybrid," that is it has a coded digital portion, representing signal components of low picture detail (and relatively high transmission power demand) that may be transmitted in a relatively low power utilization format and an analog portion, representing signal components of high picture detail (and relatively low transmission power demand). The demarcation between the analog and digital portions is a function in part of the availability of means to transmit the digital data. In accordance with the invention, the data is sent in non-active video portions of the transmitted signal.

The hybrid system is subdivided into a "basic hybrid," in which the removed and digitized low frequencies are under about 15 KHz and an "extended hybrid" in which the removed and digitized signal frequencies are under about 200 KHz. As will be explained in detail below, in the basic hybrid form of the invention, the digital part comprises video components below the line deflection frequency that are digitally coded and transmitted as data during non-active video portions of the television signal. In the extended hybrid form of the invention, the digital part comprises video components below about 200 KHz that are digitally coded and transmitted as data during non-active video portions of the television signal. Since the invention may be used with many different television signal formats, the non-active video portions of the signal may include either or both the horizontal and vertical blanking intervals.

It has also been found that further benefits are obtained by sequentially applying basic hybrid processing and extended hybrid processing (referred to as two step processing), with the basic hybrid processing being performed for the active video of each horizontal line such that the low frequency average of each horizontal line is removed from the analog signal. The remaining components below 200 KHz are subsequently removed.

Another important aspect of the inventive system is the utilization of a 2.8 MHz double sideband AM suppressed carrier that is located in the center of the 6 MHz channel. This arrangement minimizes adjacent channel interference from and to NTSC television signals and contributes to the ability to operate in the vicinity of other, normally restricted, television signals.

A further important aspect of the inventive system involves "temporal pre-emphasis," also referred to as temporal filtering, field processing or frame combing. With this approach, transmission power for stationary images is reduced while transmission power for moving images is increased. Since the average television picture is, relatively speaking, static, the use of temporal pre-emphasis is of benefit because the greater interference potential of the signal corresponding to moving images is outweighed by the fact that noise in a moving image is much less noticeable than noise in a stationary image. Temporal de-emphasis is applied in the receiver. This aspect of the invention has advantages in any "video" transmission system independent of the hybrid processing of the signal. This is due to the fact that normally there is little change between successive frames of video and emphasizing the changes relative to the static portions results in very efficient transmission.

Yet another important aspect of the inventive system involves compressing the "hybrid" video signal to achieve a large signal to noise ratio for broad, flat video areas, where noise is readily discernible, and a low signal to noise ratio for narrow video components, representing edges and video detail, in which noise is much less discernible. In the receiver, the signal is expanded to undo the compression in the transmitter. The combination of compression and expansion is referred to as "companding".

Still another important feature of the inventive system is the use of dispersal filtering to reduce the amplitudes of the peak video components by distributing their energy among the voids created in the hybrid video signal. As will be seen, these voids are the direct result of hybrid processing of the video signal whereby low frequency analog components are removed, coded and included as data in the non-active video portions of the remaining analog high frequency components.

As those skilled in the art will readily perceive, reduction of the average power of the transmitted signal is highly desirable, especially where adjacent channel and co-channel interferences are concerned. The reduction occurs because of the hybrid processing of the video signal which effectively replaces low frequency video signals with "doublets" that define the edges of the video image with temporal filtering, the largest signals result from moving video edges which can be compressed even more. Companding increases the signal to noise performance for relatively stationary edges of video images at the expense of much less observable noise associated with moving video image edges. Dispersal filtering primarily reduces the amplitudes of the signals above the hybrid processing frequency range.

Other advantages flow from application of the various aspects of the inventive system that improve signal to noise performance, especially with respect to the ability to operate in an environment of adjacent and co-channel NTSC signals. These include the technique of precise carrier frequency offset with respect to co-channel NTSC signals to cause "break up" of interfering signals and thereby reduce their visibility in the video display and co-location or locating the hybrid signal transmitter of the invention close to the adjacent channel NTSC transmitter to assure that receivers in both reception areas receive approximately equal strength signals to enable their respective AGC systems to set up properly. Also frame locking the hybrid signal to the NTSC signal and incorporating all data in the vertical blanking interval of the hybrid signal contributes to the ability to operate in a co-channel environment. It will, of course, be clear that the many aspects of the inventive system may have benefits that are independent of other aspects of the system, and that the use of one or more of the aspects in combination with each other produces even greater benefits.

OBJECTS OF THE INVENTION

A principal object of the invention is to provide novel television signal transmission systems and methods.

An additional object of the invention is to provide television signal transmission systems of improved noise performance.

A further object of the invention is to provide a novel AM television signal transmission system that requires substantially less transmitting power.

A still further object of the invention is to provide a novel FM television signal transmission system that requires substantially less bandwidth.

Another object of the invention is to provide a television transmission system that minimizes adjacent channel and co-channel interference.

Still another object of the invention is to provide an optimal television signal transmission system with better noise performance.

BRIEF DESCRIPTION OF THE DRAWINGS

These and other objects and advantages of the invention will be apparent upon reading the following description in conjunction with the drawings, in which:

FIG. 12 is a set of waveforms useful in understanding the hybrid processing of the invention;

FIG. 13 is a series of waveforms illustrating the FM bandwidth for different types of signal processing;

FIG. 14 is a block diagram of a transmitter illustrating two step hybrid processing in accordance with the invention;

FIG. 17 illustrates a temporal pre-emphasis filter and its response as used in the transmitter of FIG. 16;

FIG. 18 illustrates a temporal de-emphasis filter and its response as used in the receiver of FIG. 16;

FIG. 19 is the response characteristic of the compressor in the transmitter of FIG. 16; and FIG. 20 is the response characteristic of the expander in the receiver of FIG. 16.

DESCRIPTION OF THE PREFERRED EMBODIMENTS

Figure 1:
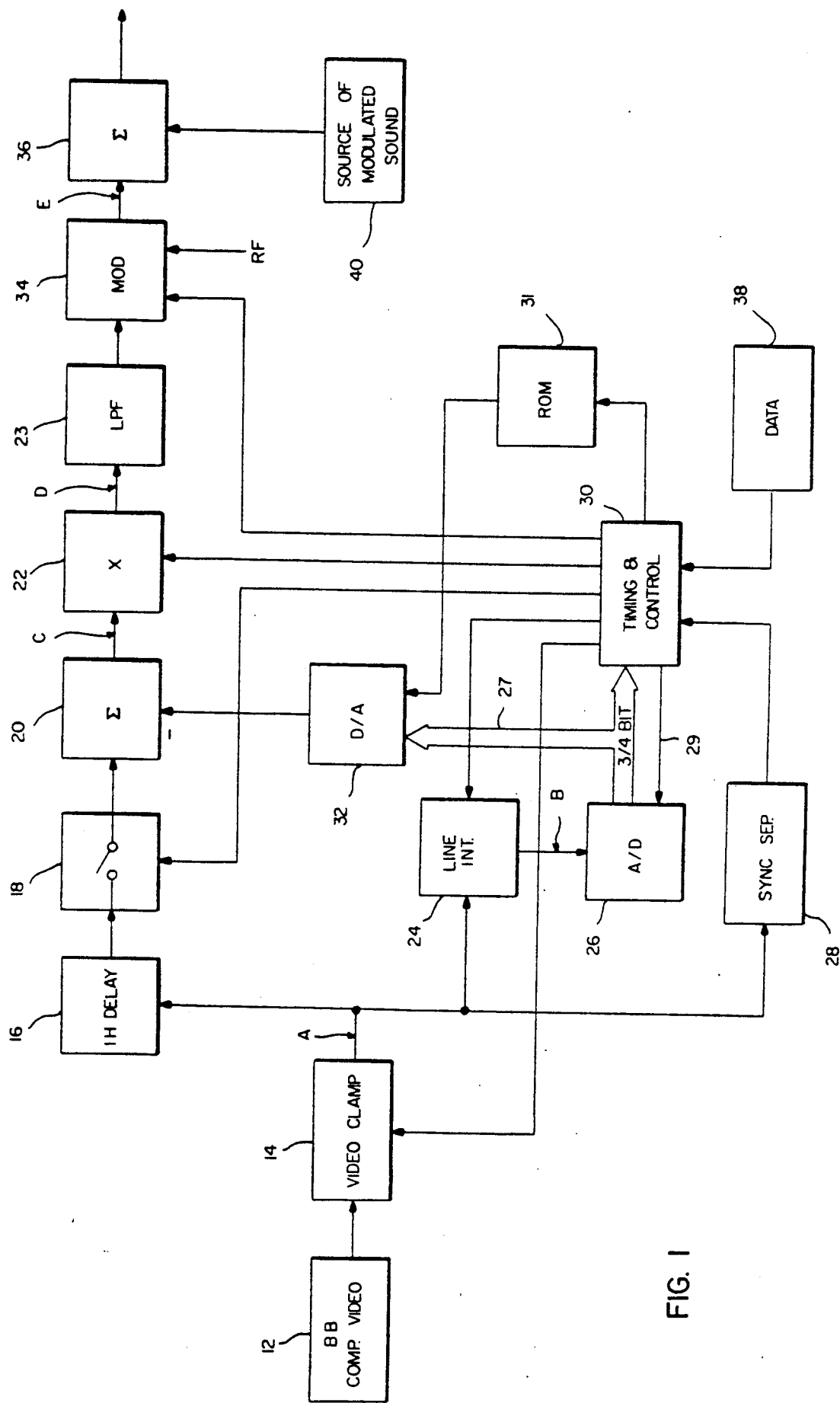
FIG. 1 is a block diagram of a basic hybrid television signal transmitter constructed in accordance with the invention.

The philosophy of the hybrid processing of the invention is to reduce the power required to transmit a television signal by extracting low frequency video analog components therefrom (that have a high transmission power requirement) and transmitting such components in a coded, low-power-consumption form along with the remaining high frequency components that are transmitted in a conventional manner. As will be discussed, this results in a substantial reduction in transmitter power required, which may be translated into better low frequency noise performance since the transmission power demand is greatest for the low frequency components. In FM transmissions, the benefit is in the form of reduced bandwidth which also improves noise performance. Hence the hybrid television signal transmission systems of the invention have improved noise performance over prior art television systems.

More specifically, in the basic hybrid form of the invention, the baseband composite video signal is subjected to "line integration" at the transmitter to determine a line averaged value of the active video for each horizontal line. In an analog version of the transmitter, the line averaged value is passed through an analog-to-digital (A/D) converter where it is converted to a digital value which is coded and transmitted with the high frequency components of the video signal. These high frequency components are obtained by subtracting an analog signal that corresponds to the line averaged digital value of the active video portion of each horizontal line. To assure that the subtracted analog signal corresponds to the appropriate portions of the baseband video signal, the baseband composite video signal is subjected to a one horizontal line delay. The output of the line integrator may be subtracted directly from the baseband video signal to obtain the high frequency components. This approach could introduce error since the coded representation of that signal, which is used in the receiver to reconstitute the low frequency components, may have resolution limitations. Preferably, digital values, representing the line averaged video signals, are supplied to a digital-to-analog (D/A) converter for developing the analog signals (low frequency components), which are subtracted from the baseband video signal. This eliminates error due to resolution limitations. Accurate reconstruction of the low frequency portions can now be accomplished in the receiver because each coded representation truly represents the subtracted low frequency portions for that video line. In a digital version of the transmitter, the analog video signal is converted to a digital signal and a digital average of the active video portion of each horizontal line is obtained.

As will be seen with reference to the extended hybrid form of the invention, frequencies below about 200 KHz are removed and sent as coded data for even greater power reduction benefits and to yield co-channel interference benefits from temporal pre-emphasis signal compression and dispersal.

Referring in greater detail to the drawings, in FIG. 1, a source 12 of baseband composite video signal supplies a video clamp circuit 14 in accordance with conventional techniques for establishing a base line reference, generally at blank level, i.e., corresponding to the level of the sync signal back porch. The output of video clamp 14 is supplied to a one horizontal line (1H) delay circuit 16, to a line integrator 24 and to a conventional sync separator circuit 28. The output of sync separator circuit 28 supplies sync pulses to a timing and control circuit 30. A data source 38 supplies information, in the form of data to be included in the transmitted television signal, to timing and control circuit 30. The delayed baseband composite video signal output from delay circuit 16 is passed through a switch 18 that is operated by timing and control circuit 30. The output of switch 18 is supplied to a summing network 20 which, in turn, supplies a multiplier circuit 22. Line integrator 24 is also coupled to, and operated under the control of, timing and control circuit 30 for integrating only the active video portion of each horizontal line of the baseband composite video signal. Its output is supplied to an A/D converter 26 which is coupled over a communication bus 27 to timing and control circuit 30. Communication bus 27 is also coupled to a digital-to-analog (D/A) converter 32. A control line 29 links A/D converter 26 and timing and control circuit 30. A ROM 31 is coupled between timing and control circuit 30 and D/A converter 32. ROM 31 supplies certain fixed reference and identification signals to D/A converter 32 as will be explained.

The output of multiplier 22 is coupled to a low pass filter (LPF) 23 to conform the data pulses to channel bandwidth limitations. LPF 23 feeds a modulator 34 which, along with multiplier 22, is under control of timing and control circuit 30. Modulator 34 is also supplied with an RF carrier and, in turn, supplies a summing network 36 that combines an audio signal from a source of modulated sound 40 with the modulated video signal of the invention for transmission to suitable receivers. Modulator 34 may either be an AM or FM modulator, with the FIG. 1 implementation being for the AM version. For an FM version, sound source 40 need only be interposed between LPF 23 and modulator 34.

In operation, timing and control circuit 30, under control of the sync signals from sync separator 28, sends appropriate timing signals to video clamp 14, line integrator 24, switch 18, multiplier 22, modulator 34, A/D converter 26, D/A converter 32 and ROM 31. The video clamp 14 maintains the sync signal back porch of the composite baseband video signal at a predetermined level. The line integrator 24 is operated to independently integrate only the active video signal portion of each horizontal line. Switch 18 is operated by timing and control circuit 30 to pass active video and color burst, but not horizontal sync, if present, to summing circuit 20. The line averaged value of video developed by line integrator 24 for a particular video line is digitized by A/D converter 26 and coupled to both timing and control circuit 30 and D/A converter 32. D/A 32 converts the output of A/D 26 to a corresponding analog signal which is subtracted from active video in summing network 20. During the horizontal sync signal portion of the composite video signal, ROM 31, in response to timing and control circuit 30, couples a digital pedestal signal to D/A 32, which is converted to a corresponding analog pedestal signal and inserted into the signal developed in summing network 20. It will be appreciated that some video signal formats may not have horizontal syncs or blanking intervals between successive horizontal lines.

Timing and control circuit 30 develops a data signal comprising positive and negative voltage data pulses representing the digitized line averaged signals from A/D 26 and applies these data pulses, during the horizontal blanking intervals, to multiplier 22. Multiplier 22 multiplies these data pulses with the analog pedestal signal previously inserted in the horizontal blanking interval to develop positive and negative data pulses during the horizontal blanking interval of the signal. As will be discussed below, the resultant coded representations of the line averaged signals are used to reconstitute the signal in the receiver.

While the number of data pulses that may be inserted in the horizontal blanking interval is dependent upon the data frequency, the inventive system envisions that other coded data may be included in the horizontal blanking interval if desired, specifically data from data source 38. While the coded representation of the digital output of A/D converter 26 for each video line preferably comprises three or four bits (3/4), more bits can be used depending upon the resolution desired. To assure accuracy of the reconstituted signal in the receiver, this line varying 3/4 bit digital signal, which represents high (transmission) energy, low frequency components of the video signal, is passed through D/A converter 32 to form an analog signal that is subtracted from the composite baseband video signal. Due to the resolution limitations of the 3/4 bit signal, a small residue of low frequency components may remain in the analog video signal that is passed by summing network 20 to multiplier 22. However, since the low frequency video component added to the high frequency video component is derived from the same 3/4 bit signal, it will precisely match that which was subtracted at the transmitter.

Figure 2:
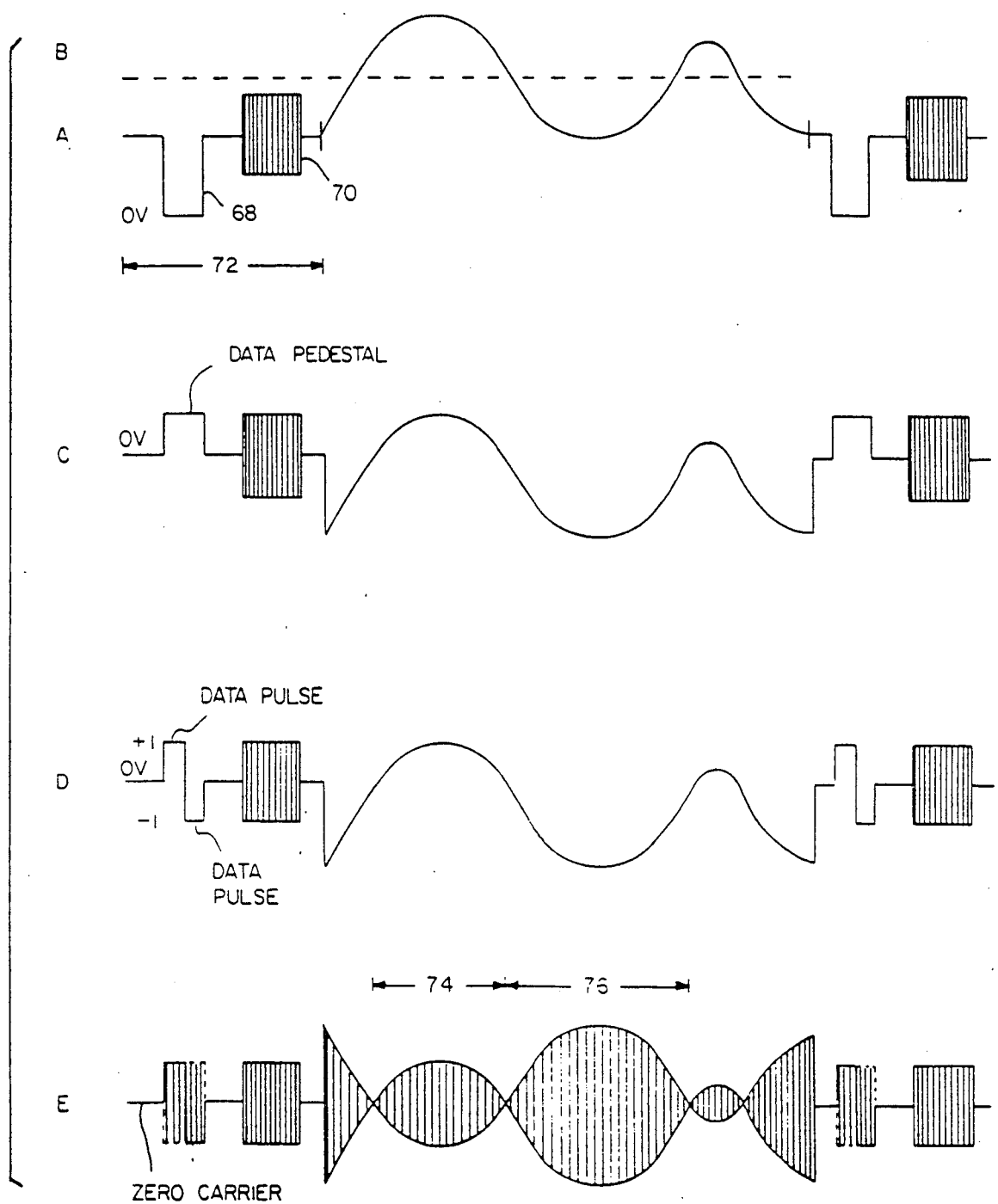
FIG. 2 is a series of waveforms useful in explaining the invention illustrated in FIG. 1.

In FIG. 2, the series of idealized, not-to-scale waveforms labelled A, B, C, D and E correspond to those appearing at correspondingly labelled portions of FIG. 1. Waveform A represents the baseband composite video signal with negative-going 15.75 KHz horizontal sync pulses 68, a 3.58 MHz color burst 70 and a horizontal blanking interval 72. Waveform B is indicated as a dashed horizontal straight line and represents the output of line integrator 24 which corresponds to the average level of the active video signal between successive horizontal blanking intervals 72. Waveform C represents the result of the subtraction of the line averaged video from the composite video signal and is centered at zero volts. It also includes the data pedestal added in summing network 20. Waveform D illustrates the result of multiplier 22 multiplying data with the data pedestal to develop positive and negative data pulses during the horizontal blanking period. While only two such pulses are shown for simplicity, a greater number of pulses is contemplated. Modulator 34 modulates an RF television frequency carrier with the bandwidth limited video signal, including the data pulses, for transmission as illustrated by waveform E. The signal is centered about zero carrier and reverses phase each time the envelope passes through the zero carrier level. Thus, for example, each half cycle of the color burst, as well as each data pulse, reverses phase. Portions 74 and 76 of the waveform represent RF carrier phase reversals in the video signal.

Figure 3:
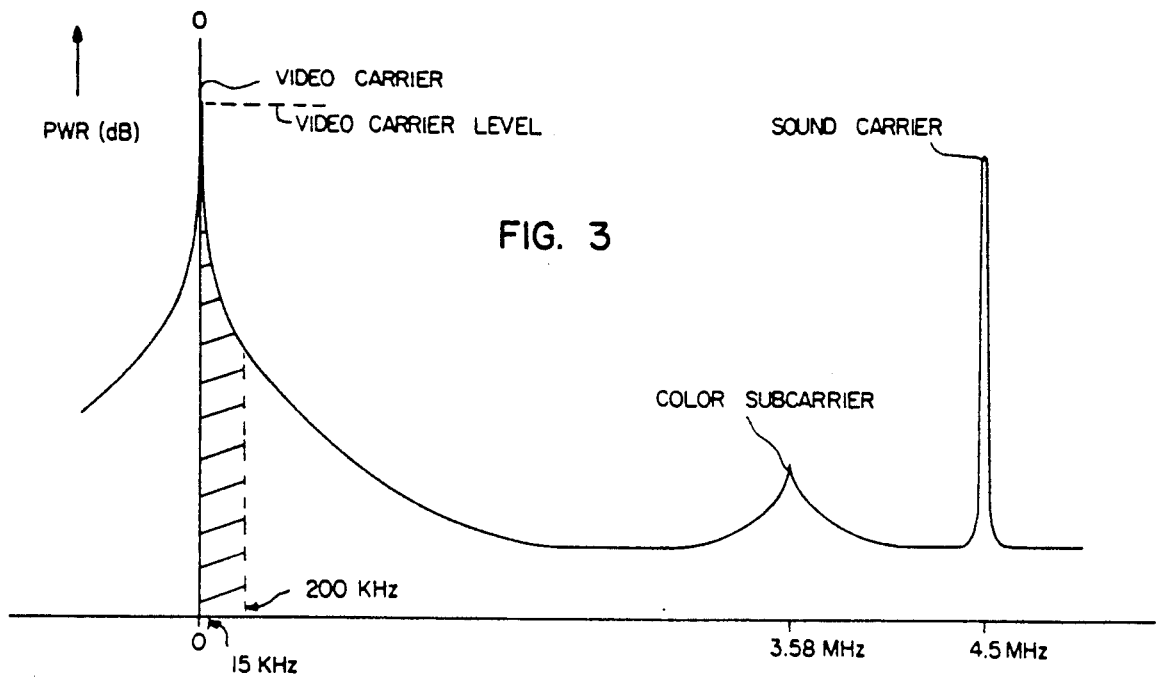
FIGS. 3 and 4 are graphs of power distribution of a typical AM modulated television signal.
Figure 4:
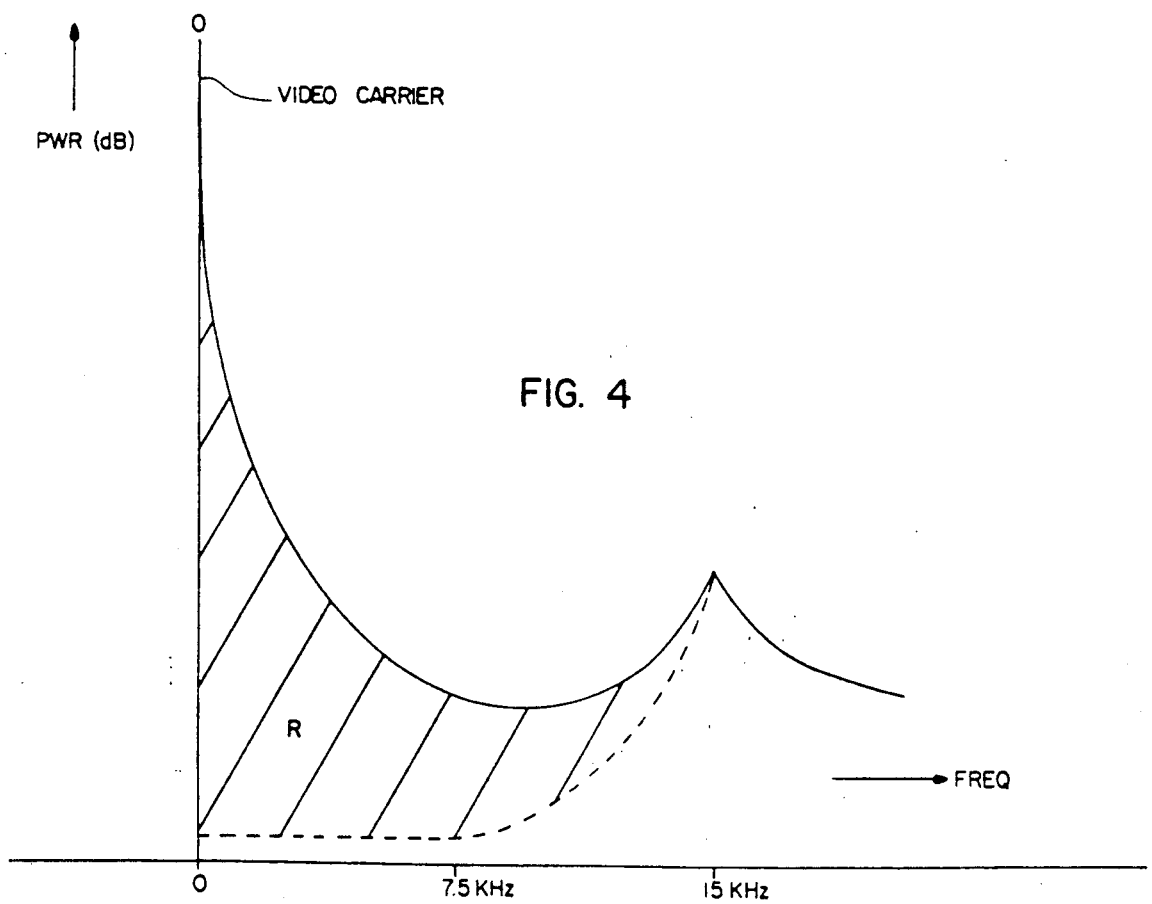

Referring to FIG. 3, an idealized representative spectrum of power distribution of an NTSC type television signal indicates the very significant power demand on the transmitter near the carrier frequency. FIG. 4 shows a very greatly expanded portion of the curve of FIG. 3 near the video carrier frequency. In particular the portion of the spectrum between the video carrier frequency and 15 KHz is illustrated. The shaded area bounded by the waveform and the dashed line illustrates pictorially the power saved with the basic hybrid form of the invention because of the subtraction of the low frequency signal components (below 15 KHz) from the transmitted signal. These low frequency components are instead transmitted in the form of data in a coded low-energy utilization format as explained above. This shaded area is estimated to represent approximately 99% of the power of a typical television signal. A reduction in transmitted power of 20dB (100:1) is thus well within that contemplated by the invention. Some of this power reduction may, of course, be sacrificed as a tradeoff to improve the signal-to-noise ratio of the transmitted signal. It should be borne in mind that since the power scales of the curves are logarithmic, the do not graphically convey the true magnitude of power reduction obtained with the invention.

A shaded area between 0 and 200 KHz on FIG. 3 will be discussed later in connection with the extended hybrid form of the invention in which analog components up to about 200 KHz are removed. While the additional transmission power savings from removing components below 200 KHz is not nearly of the magnitude as with the basic hybrid, the benefits obtained in compressing and dispersal of the peak video signals produced are very significant. It should also be pointed out that the coded data need not be put in the horizontal intervals of the transmitted signal, but may advantageously be transmitted in the vertical blanking intervals of the transmitted television signal. Indeed, as fully disclosed in the copending application above, the transmitted video signal need not have horizontal blanking intervals, or even horizontal sync. In general, the data may be placed in any non-active video portion of the television signal for optimum noise performance.

Figure 5:
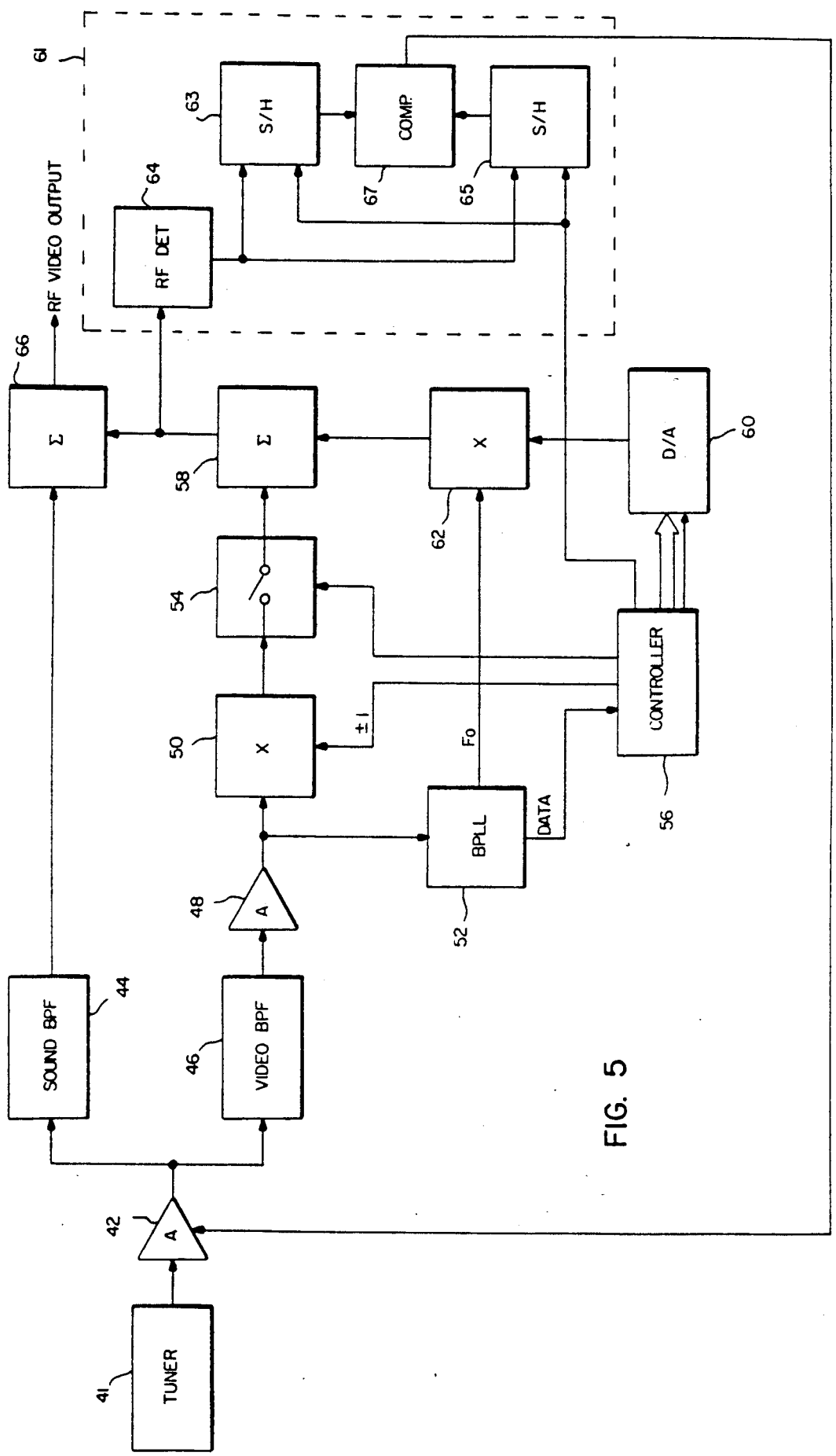
FIG. 5 is a block diagram of a basic hybrid television receiver constructed in accordance with the invention and operating at RF frequencies.

In the receiver of FIG. 5, the basic hybrid form of transmitted signal is received by a tuner 41 and supplied to a buffer amplifier 42. The output of amplifier 42 supplies a sound carrier bandpass filter 44 and a video carrier bandpass filter 46. The receiver operates at RF frequencies, although operation at IF and baseband frequencies are also contemplated. The output of sound bandpass filter 44 is supplied to one input of a summing network 66. The output of video bandpass filter 46 is supplied to a buffer amplifier 48. Buffer amplifier 48 feeds a multiplier 50 and a biphase stable phase locked loop (BPLL) circuit 52. The output of multiplier 50 is supplied through a switch 54 to a summing network 58. The data output of BPLL 52 is supplied to a controller 56 which, in turn, controls operation of multiplier 50 and switch 54. Controller 56 also supplies data, including the coded representation of the line averaged video, to a D/A converter 60. In the preferred embodiment, BPLL 52 is biphase stable and operates to provide recovered data, including the coded representation of line averaged video, to controller 56 and a fixed amplitude carrier Fo, that is either in phase or 180° out of phase with the received signal, to a multiplier 62. BPLL 52 may advantageously be constructed in accordance with the teachings of Ser. No. 025,240, filed 3/12/87, entitled COMBINED FPLL AND PSK DATA DETECTOR, in the names of R. Citta and G. Sgrignoli, and assigned to Zenith Electronics Corporation. That application cites U.S. Pat. Nos. 4,072,909, issued 2/7/78, and 4,091,410, issued 5/23/78, both in the name of R. Citta, as examples of biphase stable loops. The copending application and the mentioned patents are incorporated herein by reference.

The received signal at the output of amplifier 48 is either in phase with, or 180° out of phase with, Fo. A special identification signal, (to be discussed in further detail hereinafter) inserted at the encoder by ROM 31 (FIG. 1) into the vertical interval of the television signal, is also recovered as part of the data and is interpreted by the controller to determine whether the phase of the received signal should be reversed to establish the correct phase relationship. Multiplier 50, under control of controller 56, multiplies the signal at the output of amplifier 48 by either +1 or −1 to assure the correct phase relationship with Fo. Those skilled in the art will recognize that, alternatively, the phase of Fo may be controlled by appropriate multiplication rather than by controlling the phase of the received signal as described. In either case, after any necessary corrections, Fo and the received signal will have the same phase. It will of course be appreciated by those skilled in the art that any other well-known technique may be used in place of that discussed for determining the correct phase of Fo.

Controller 56 develops a number of clock or timing signals from the received color burst in a well-known manner. It will be recalled that the color burst of the encoded signal changes RF carrier phase every half cycle thereby providing a conveniently detectable timing reference. These signals include a high frequency clock locked to the color burst and a horizontal rate clock derived by counting down therefrom. A low frequency clock is developed from an identification signal, to be described. Data is removed from the incoming signal by opening switch 54 during time periods corresponding to the occurrence of data. Sync information, i.e., a sync pulse and pedestal, is regenerated in the controller and applied via D/A 60 and multiplier 62 to summing network 58.

Multiplier 62 multiplies Fo with the output of D/A converter 60 to produce a carrier signal, the amplitude of which is determined by the coded representation of the line averaged low frequency video, for addition to the received video signal supplied to summing network 58. The output of summing network 58 is therefore the reconstituted video portion of the television signal. This signal is supplied to a special AGC circuit 61 and to summing network 66 where it is recombined with the sound modulated carrier and passed to conventional television signal processing circuitry (not shown). The output of AGC circuit 61 controls the gain of amplifier 42 to assure that the analog value of the digital representation of the line averaged video at the receiver matches that in the transmitter since the digital data is not altered by transmission attenuation as are analog portions of the signal.

The special AGC circuit 61 includes an RF detector 64, a pair of sample and hold (S/H) circuits 63 and 65 and a comparator 67. As will be explained, a reference signal is transmitted and portions thereof are sampled in the receiver to determine attenuation effects on the analog portions of the signal and to compensate the receiver gain accordingly.

Figure 6:
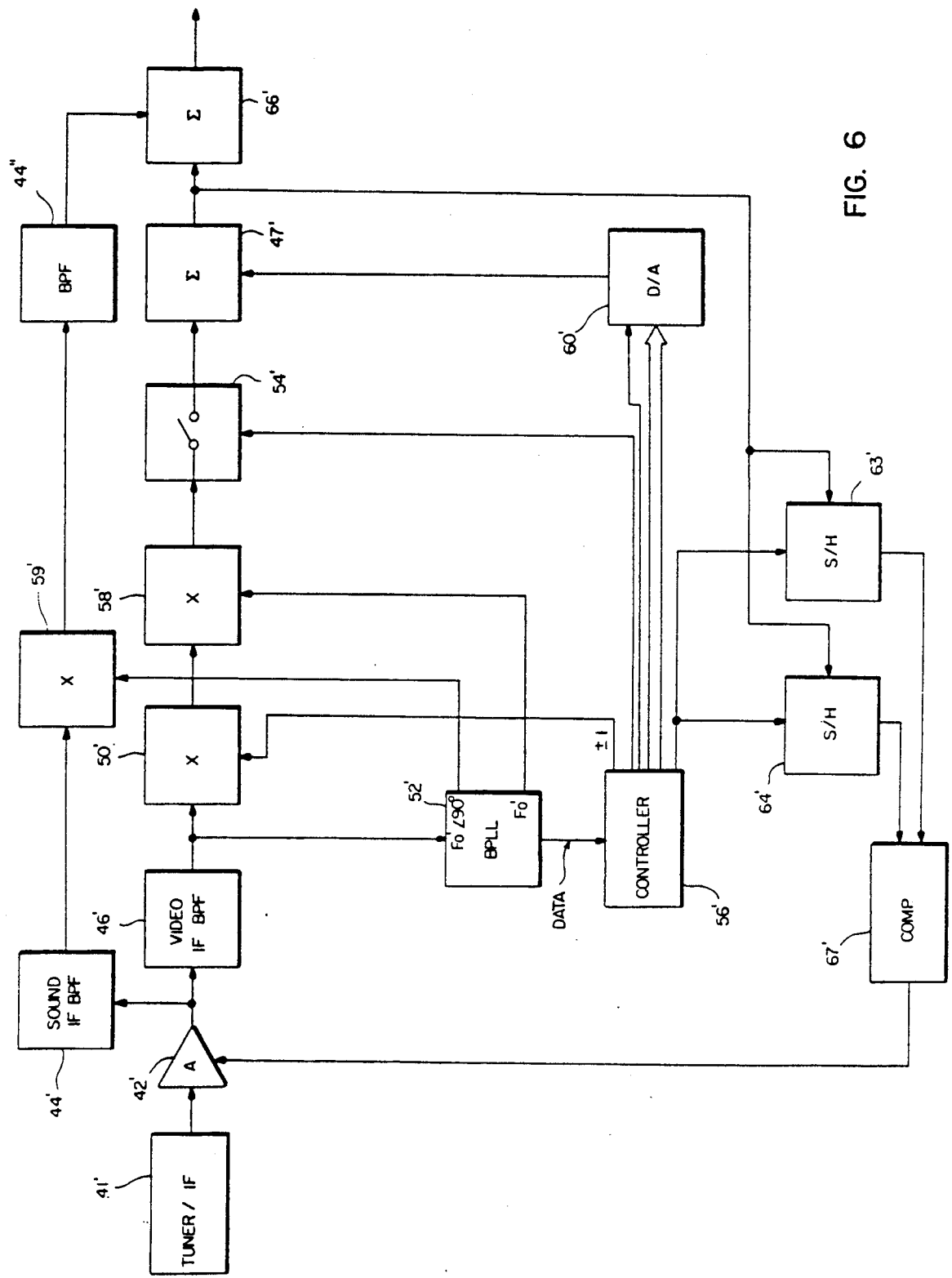
FIG. 6 is a block diagram of a basic hybrid television receiver constructed in accordance with the invention and operating at baseband frequencies.

While the receiver of FIG. 5 operates at RF frequencies, in many installations, it is desirable that the receiver operate at baseband frequencies and FIG. 6 illustrates such a receiver. A tuner/IF 41' receives the transmitted signal and applies an IF signal through an amplifier 42' to a video IF bandpass filter 46' and to a sound IF bandpass filter 44'. Filter 46', in turn, supplies the IF signal to a BPLL 52' and to a multiplier 50'. Data is removed by BPLL 52' and applied to a controller 56'. BPLL 52' also recovers a pair of quadrature-related IF carriers Fo' and Fo' 90°, Fo' being applied to a multiplier 58' and Fo' 90° to a multiplier 59'. Controller 56' determines on the basis of a received reference signal whether the phases of the received signal and Fo' are the same and controls multiplier 50' to reverse the phase of the signal, if necessary, by multiplying by a +1 or by a −1. Multipliers 58' and 59' function as synchronous detectors for developing output baseband video and 4.5 MHz sound signals, respectively, in response to Fo' and Fo' 90°. The 4.5 MHz sound signal is applied to a 4.5 MHz sound BPF 44" and the composite video signal is applied to a switch 54'. Switch 54' is operated by controller 56' to open during data and horizontal sync portions of the received signal. A D/A 60' is operated by controller 56' and supplies one input of a summing network 47', the other input being supplied by switch 54'. D/A 60' supplies the sync and sync pedestal to summing network 47' along with an analog signal corresponding to the coded representation of the low frequency components sent in the data recovered by BPLL 52', which are added to the baseband video signal developed at the output of switch 54' A reconstituted baseband video signal therefore appears at the output of summing network 47' and is applied directly to a pair of S/H circuits 63' and 64', which are operated under control of controller 56' to sample the reference signal that is transmitted to determine the attenuation effects on the analog portions of the transmitted signals. Again a comparator 67' supplies any correction required to adjust the gain of amplifier 42' to match the analog signal portions with the digital representations. The reconstituted video signal is also combined with the 4.5 MHz audio signal in a summing network 66' to provide an output baseband television signal which may be applied to a television monitor or the like for viewing.

Figure 7:
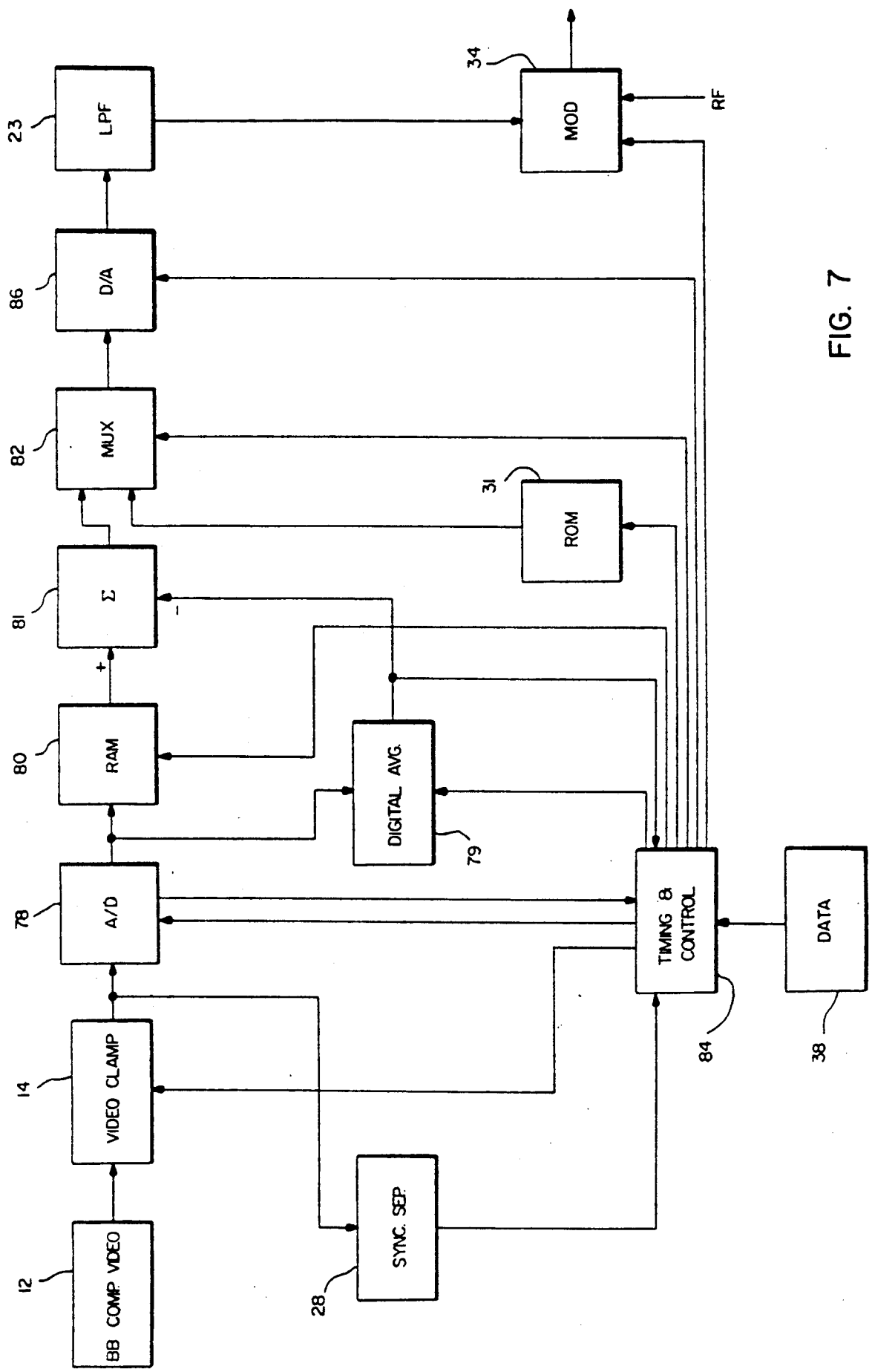
FIG. 7 is a digital implementation of a basic hybrid transmitter constructed in accordance with the invention.

Referring to FIG. 7, a digital implementation of a transmitter constructed in accordance with the basic hybrid form of the invention is shown. A baseband source of composite video signal 12 is coupled to video clamp 14, the output of which supplies an A/D converter 78 and a sync separator circuit 28. A timing and control circuit 84 is intercoupled with A/D converter 78 and is supplied with the output of sync separator 28. Video clamp 14 is operated under control of timing and control circuit 84 to clamp the incoming video signal at the back porch level. The source of data 38 is coupled to the timing and control circuit 84. The output of A/D converter 78 is supplied to a digital averaging circuit 79 and to a RAM memory 80. Digital averaging circuit 79 is operated under control of timing and control circuit 84 to sample the output of A/D converter 78 during the active video portions of the signal and to develop an average of the digital values for each individual horizontal line. This value is supplied back to timing and control circuit 84 and to a summing network 81 which is also supplied with the output of RAM memory 80. RAM memory 80 comprises a two video line memory in which one video line is written in as the previous video line is read out. This arrangement introduces a one line delay to assure that the digital average signal is subtracted from the video samples of the appropriate horizontal line. The output of summing network 81 is supplied to a multiplexing circuit 82 which is also coupled to the output of a ROM 31. ROM 31 supplies the reference and identification signals to the multiplexer 82 as will be described further below. Data from data source 38 and timing and control circuit 84 is applied to a third input of a multiplexer 82 during the horizontal blanking intervals of the signal. The data includes a coded representation of the line averaged values developed by digital averaging circuit 79. The output of multiplexer 82 is coupled to a D/A converter 86 whose output is supplied to a low pass channel filter 23 and thence to a modulator 34. Summing network 81, multiplexer 82, D/A converter 86 and modulator 34 are all operated under control of timing and control circuit 84. Modulator 34 is supplied with an RF signal and its output is further processed as indicated in FIG. 1.

Referring back to FIG. 2, it will be seen that the waveform C is obtained by subtracting waveform B from waveform A during the active video portions of each horizontal line, except during the horizontal blanking interval 72. It will be appreciated by those skilled in the art that a similar result would be obtained by adding a waveform of magnitude B to the horizontal blanking interval only and correcting for the resulting change in zero level. When considering the digital implementation of the encoder, the latter technique involves considerable simplification and is the presently preferred method of implementation for this version of the invention.

In FIG. 7, the output of the A/D converter 78 preferably comprises approximately 910 samples per horizontal line with about 752 of those samples representing the active video portion of the line. Each sample is represented by either 8 or 10 bits depending upon the output resolution desired. For example, for ordinary commercial type television signals, an 8 bit resolution is sufficient, whereas for studio level quality and transmission applications, a 10 bit resolution is preferred. The number of bits selected for the active video portion is preferably divisible by 2 which greatly simplifies the hardware. As alluded to previously with respect to FIG. 2, it may be preferable to add the line averaged value (waveform B) to the horizontal blanking interval of the signal rather than to subtract the line averaged value from the active video portion. This would entail approximately 60 additions as compared with approximately 752 subtractions and would again materially simplify the operation and hardware. However, the result would be the same after correction for the zero level and the particular technique utilized should not be considered limiting of the invention. The digitally processed signal is then supplied from the summing network 81 to the multiplexer 82 along with data from timing and control circuit 84 and the fixed identification and reference signals from ROM 31. After passage through D/A converter 86, the signal is handled in the same manner as described with respect to the transmitter of FIG. 1.

Because of the nature of the transmitted television signal, that is, a hybrid of analog and coded digital information, a system for compensating for transmission attenuation experienced by the analog signal (which does not alter the digital data) is provided. In order to properly reconstruct the received signal, the analog video signal may need to be adjusted to maintain the same relationship, between it and the digital data, that existed at the transmitter. The invention provides for sending a reference signal with a known relationship between the analog and digital data, detecting that signal in the decoder and comparing the detected levels to determine the amount and polarity of adjustment required, if any.

Figure 8:
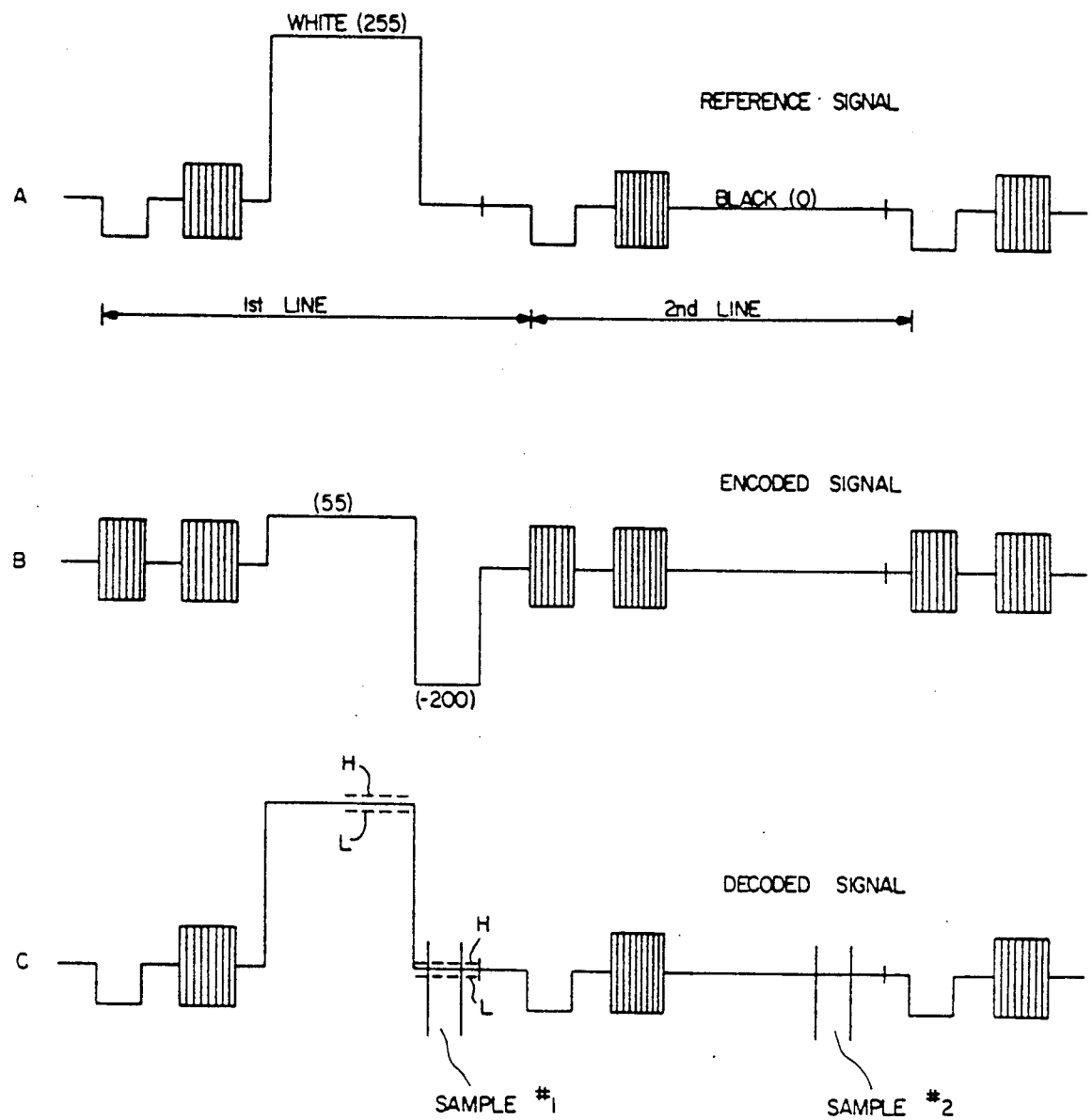
FIG. 8 is a series of waveforms explaining a novel signal level compensator for use with the hybrid aspect of the invention.

Referring to FIG. 8, waveforms A, B and C, depicting two horizontal lines of a transmitted signal are shown. Waveform A constitutes a reference signal which comprises a white line (indicated as digital level 255) that falls to zero or black level (indicated as 0) followed by a second line of no video or black level. Waveform B represents an encoded counterpart of the reference signal (A) in which the white line has been reduced to a digital level of 55 by subtraction of an assumed average level of 200. The black level portion of the video line now occupies a level of −200, reflecting the subtraction of the average level of 200 therefrom. The second line, however, is unchanged in the active video portion since its average level is zero. Waveform C represents the decoded (reconstituted) signal and also indicates two sample areas identified as sample #1 and sample #2. Samples of the levels are taken at the indicated areas and stored in the sample and hold circuits of the receiver. Under conditions where the analog signal does not experience attenuation, sample #1 will reflect that the signal level has been returned precisely to zero level and will match sample #2. Should the decoded (reconstituted) signal be higher, as indicated by the dashed line portion H, sample #1 will be greater than sample #2 and the output of comparators (67 in FIG. 5 and 67, in FIG. 6) will generate a correction voltage for application to amplifier 42 or 42'. If, on the other hand, the decoded signal is at a lower level L, sample #1 will be less than sample #2 and an opposite type correction will be supplied from the comparator to the amplifier. The provision of this reference signal, including one horizontal line with a significant analog video portion and a subsequent line with a zero analog video portion, provides a built-in standard for determining what has happened to the analog signal during transmission and processing.

Figure 9:
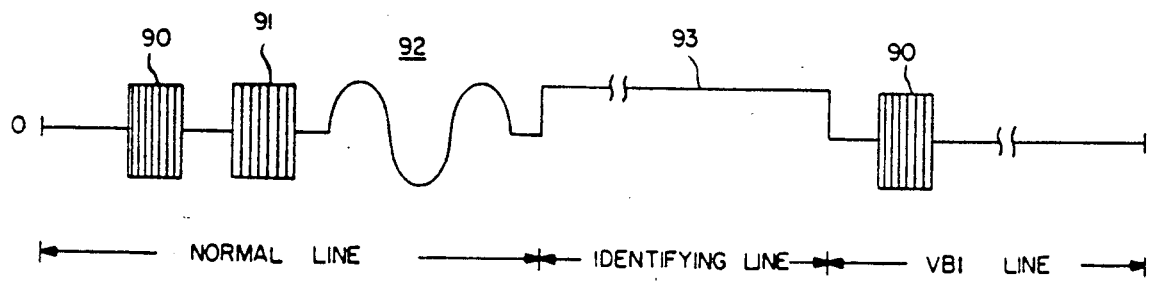
FIG. 9 illustrates a form of identification signal useful with the hybrid aspect of the invention.

In FIG. 9, one form of identification signal is shown that serves the dual purpose of providing a start signal for timing purposes and for identifying the proper phase relationship between the video carrier signal and Fo. A normal encoded line (shown not-to-scale) includes data, horizontal pulses 90, a color burst 91 and an active video portion 92, which assures a certain number of zero crossings. Detection is based upon no zero crossings occurring during a line. An identification line is established without zero crossings by removing data pulses and color burst. The polarity of the video signal 93 may be used to indicate a particular phase relationship between the video carrier and the recovered Fo signal. The next line, assumed to be in the vertical blanking interval, does not have color burst, but does have data pulses. Thus, it too exhibits zero crossings. It will be appreciated that this illustration is but one of many arrangements that may be used for an identification signal.

Figure 10:
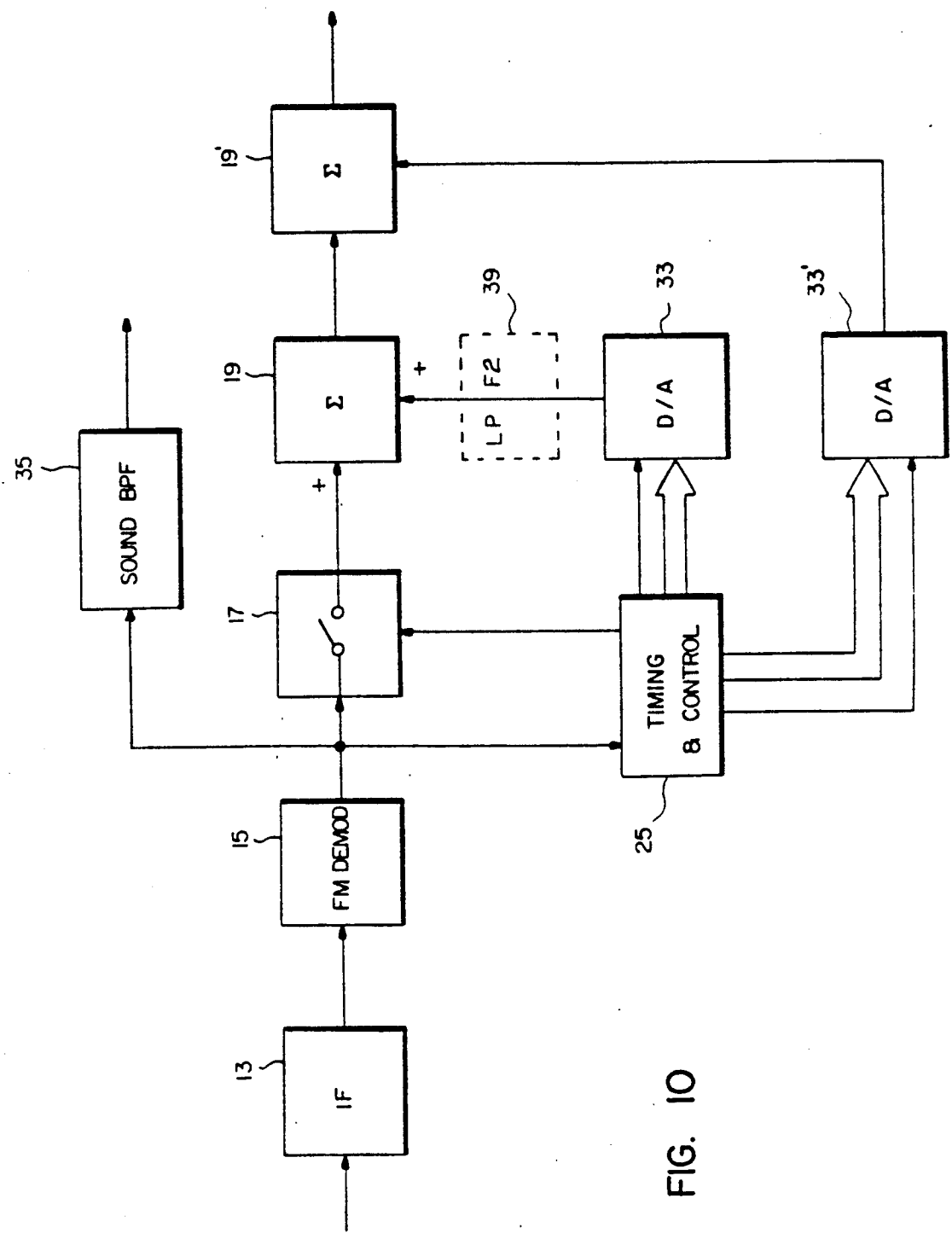
FIG. 10 is a block diagram of a receiver for processing a hybrid FM modulated transmitted signal.

In FIG. 10, a receiver for receiving a basic hybrid processed FM television signal is shown. The signal received by IF 13 is supplied to a conventional FM demodulator 15 which in turn is coupled to a switch 17, a timing and control circuit 25 and a sound bandpass filter 35. Timing and control circuit 25 receives data from demodulator 15 and controls operation of switch 17 as well as supplying the coded data information to a D/A converter 33. The sync signal information is used to develop timing signals which are supplied to a D/A 33'. The output of switch 17 feeds a summing circuit 19 as does the output of D/A converter 33. The output of summing circuit 19 is supplied to another summing circuit 19' which is also supplied with the timing signals from D/A 33'.

The dashed line block 39 labelled LPF 2 is not used in the basic hybrid FM receiver, but is used in conjunction with an extended hybrid receiver for receiving an extended hybrid processed signal as discussed below.

The basic hybrid processing circuit described removes low frequency analog video signal components (below the horizontal line frequency) by subtracting the line averaged value of these components from the analog signal. This will be recognized as a specific example of a more general hybrid approach to television signal processing in which the video signal is divided into low frequency and high frequency components. It will be noted that the low frequency video components under 15 KHz account for the vast majority of transmission power required and that the removal of additional analog video components (under about 200 KHz) does not result in significant additional transmission power savings. However, extended hybrid processing does yield highly beneficial resulting terms of developing a television signal of improved signal to noise performance and having minimum co-channel and adjacent channel interference potential with respect to NTSC signals. Thus, in the extended hybrid processing system of the invention, video signal components below about 200 KHz are removed, converted into digital form and coded data representative of the removed components is sent in a non-active video interval of the analog signal.

Figure 11:
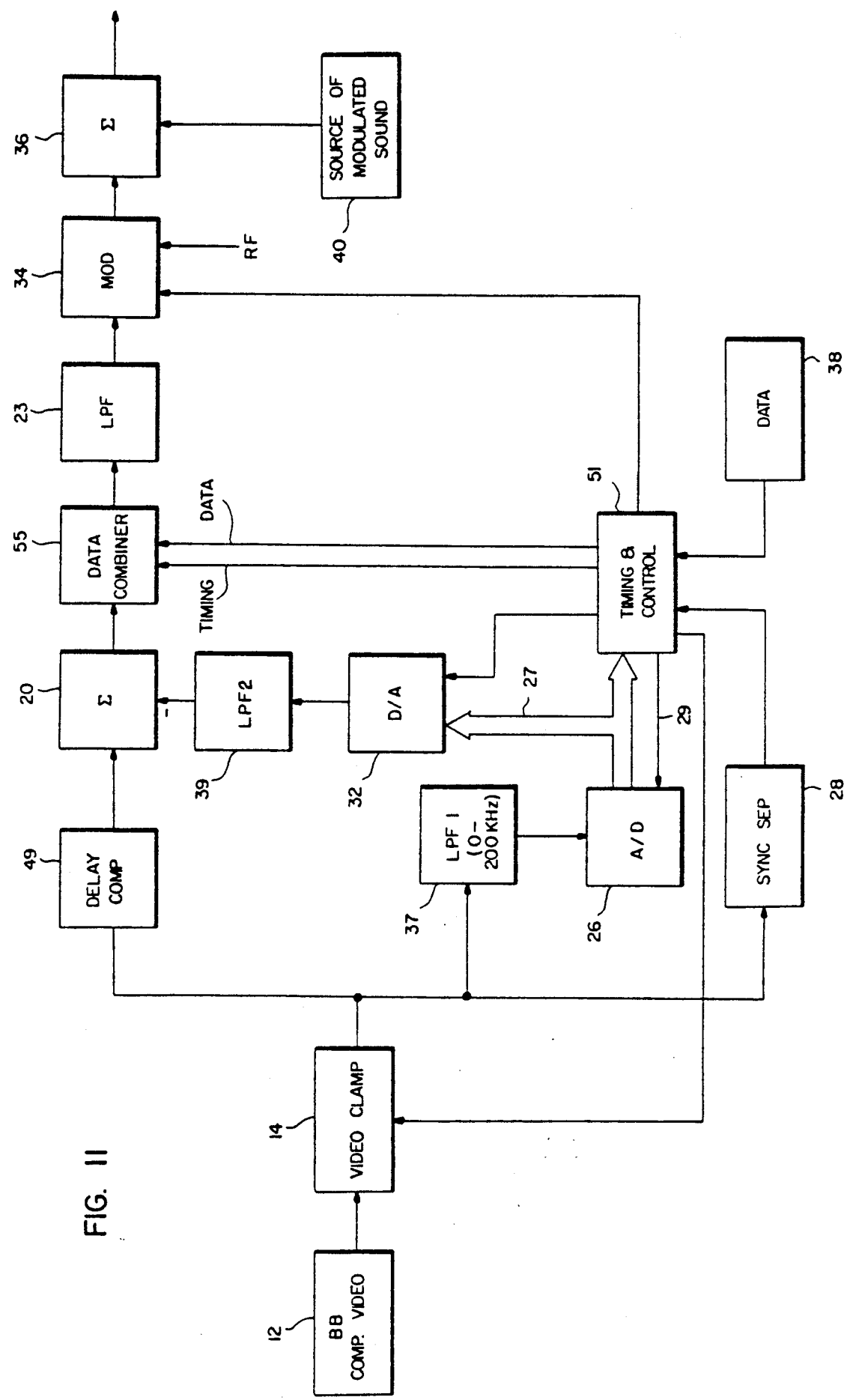
FIG. 11 is a block diagram of an extended hybrid television signal transmitter constructed in accordance with the invention.

In the extended hybrid transmitter of FIG. 11, the output of video clamp 14 is supplied to a delay compensation network 49, which in turn is coupled to a summing circuit 20. The video signal is also supplied to sync separator 28 and to a low pass filter (LPF 1) 37. The filter 37 is indicated as passing frequencies up to about 200 KHz. The output of filter 37 is supplied to A/D converter 26 which in turn supplies D/A converter 32, the output of which is coupled to a filter 39 (LPF 2) and to a timing and control circuit 51. The output of filter 39 is subtracted from the full analog video signal in summing circuit 20. A data combiner 55 receives the output of summing circuit 20 and data and timing signals from a timing and control circuit 51. The remainder of the circuit is substantially the same as that of FIG. 1 and operation is essentially the same. Filter 39 is not required if a full resolution digital coded representation is used. In most instances, however, the number of bits from A/D converter 26 will be limited, thus limiting the resolution, and filter 39 is included to assure that the transmitted signal will match that produced in the receiver.

In FIG. 12, the effects of basic hybrid and extended hybrid processing on an idealized video signal consisting of a pulse and a bar are illustrated. Curve A represents the video signal having a relatively sharp pulse followed by a fairly broad bar. As shown, the average signal level is significantly above 0 volts. Curve B illustrates a pulse 57 and a bar signal when it is subjected to basic hybrid signal processing in accordance with the invention. It will be seen that the average signal level has been subtracted, thus reducing the overall magnitude of the signal. Curve C shows the signal after extended hybrid processing in accordance with the invention. Here it is seen that only high frequency signals, such as doublets 43 and 45 and pulse 57, which correspond to video edges and video detail, remain since the low frequency components, up to about 200 KHz, have been removed. In particular, extended hybrid processing produces a significant number of voids, such as that indicated at 47, in the transmitted analog signal. As will be discussed below, the voids are extremely useful for reducing the peaks in the remaining transmitted analog signal by the techniques of compression and dispersal filtering. As is well known, peak signals are of greatest importance when dealing with co-channel and adjacent channel interference problems.

FIG. 13 illustrates the effects of hybrid processing of a square wave video signal on FM transmission bandwidth. Curve A illustrates a basic hybrid processed signal corresponding to a horizontal line of a one-half white and one-half black screen. Waveform B illustrates the transmission bandwidth centered about a carrier frequency Fo for the signal. In the extended hybrid processed waveform illustrated by curve C, only signal spikes in the form of doublets remain and the bandwidth shown by curve D is very much narrower, with the frequency deviation due to the black and white level signals, folding onto each other at the center frequency Fo since they each correspond to a zero volt signal. The extended hybrid signal FM transmission bandwidth is thus seen to be very much smaller than the bandwidth corresponding to the basic hybrid processed signal. This FM transmission bandwidth reduction translates into significantly improved noise performance in the FM channel and is an outstanding attribute of the extended hybrid processing of the invention. It should be noted that while signal to noise performance is greatly improved, no information is lost (the removed low frequency information is replaced in the receiver) and consequently distortion is not increased.

As mentioned, peak signal magnitude is the major factor in contributing to adjacent channel and co-channel interference problems. Such peaks, in the form of doublets and pulses, are produced in the extended hybrid processing in response to video edge and video detail, i.e. whenever the video level changes rapidly. As was also discussed above, the signal level during non-video portions of the signal (blanking periods) is arbitrarily established in the hybrid processing system. As has been shown in the basic hybrid system, the line averaged video is used to set the horizontal line signal level at the average signal level for that line. Consequently, when the blanking interval ends, the video signal level will in all probability be closer to its average value for the line than it would be to an arbitrary level that had been established. Therefore, the magnitude of video level change (and of doublets produced by extended hybrid processing) will be minimized by setting the line to the average video level for that line. As mentioned in connection with the copending application, the transmitted video signal need not have horizontal blanking intervals, nor horizontal sync. It will, of course, have a line structure, and there will be transitions from line to line. These transitions appear as doublets when hybrid processed, and it would be of benefit to minimize their amplitude. Therefore two step processing is employed in which the line average of a line is removed with basic hybrid processing, prior to performing extended hybrid processing. Thus, two step hybrid processing is very desirable since with it, the level of the video signal between lines (and in the vertical blanking interval) is set to the average video signal level to reduce the magnitude of doublets produced. It is also contemplated that the average of adjacent video lines be used to reduce the doublet magnitude.

FIG. 14 shows a transmission system that incorporates two step processing, i.e. first basic hybrid and then extended hybrid processing. The basic hybrid processing occurs by virtue of line integrator 24, A/D converter 26 and D/A converter 32, one H delay circuit 16, switch 18 and summing circuit 20. The extended hybrid processing occurs by virtue of filter 37, A/D converter 26', D/A converter 32', filter 39, delay compensation circuit 49 and summing circuit 20'. The basic hybrid processing is performed first and is followed by the extended hybrid processing. Timing and control circuit 53 supplies appropriate timing and data signals to data combiner 55. As mentioned, the data is placed in non-active video portions of the signal, which will generally comprise the vertical blanking periods or both horizontal and vertical blanking periods.

Figure 15:
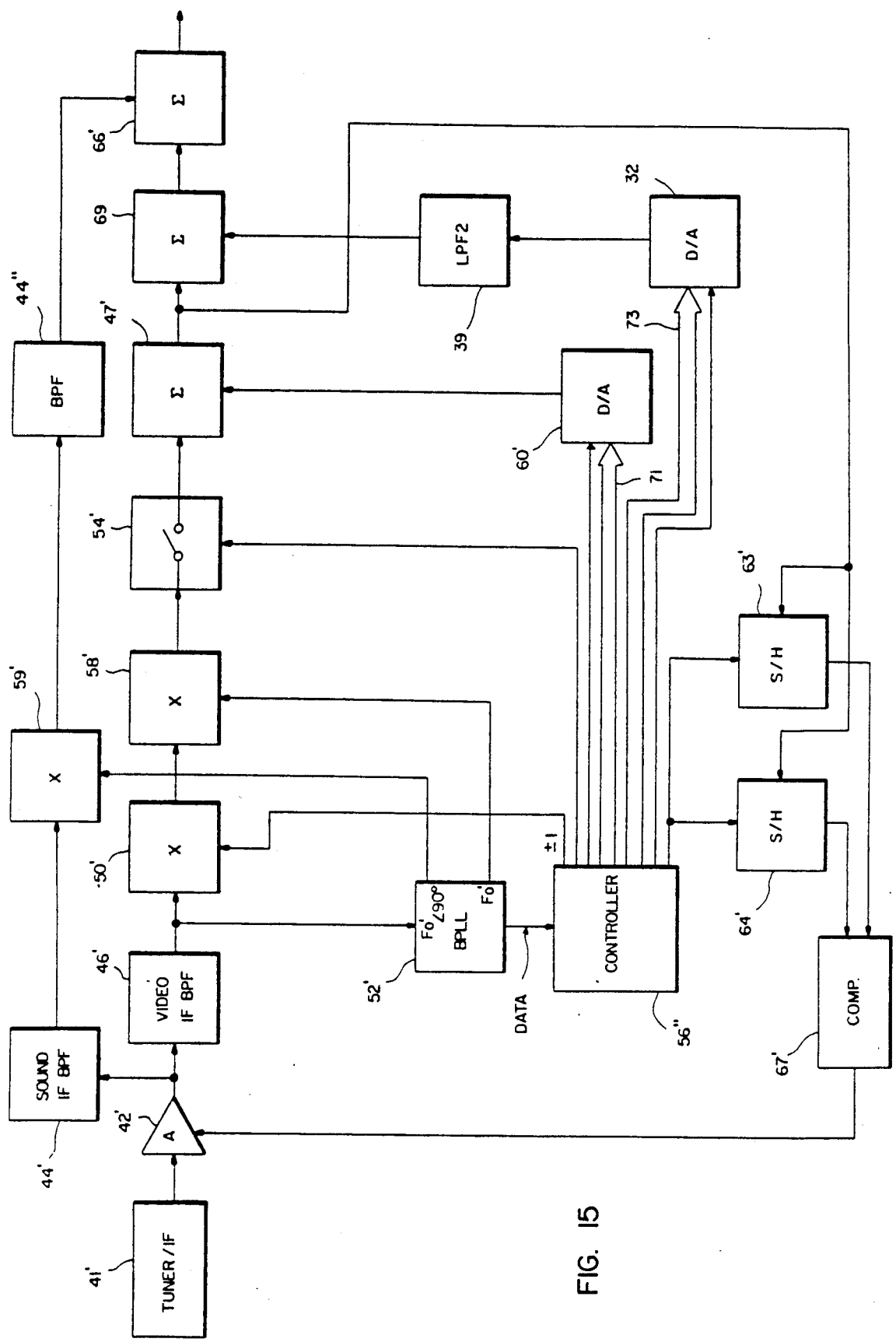
FIG. 15 is a block diagram of a receiver utilizing a two step hybrid processed signal.

FIG. 15 illustrates the basic hybrid receiver of FIG. 6 modified to accept a two step hybrid processed signal such as that produced by the transmitter of FIG. 14. The receiver includes a D/A 32 and a filter 39 which are supplied with the extended hybrid data by controller 56''. After detection by BPLL 52', the removed basic low frequency information is added in summing network 47', and the remainder of the low frequency information is added in summing network 69. The frequency response characteristic of LPP2 filter 39 is, of course, the same as that of LPF2 39 in the transmitter, which is indicated by the same reference number being used for each.

The basic hybrid and extended hybrid processing of the invention, when combined with certain well known techniques in the art such as temporal pre-emphasis or filtering (also referred to as frame combing or field processing) signal compression, time dispersal and pre-emphasis, yields a television system of optimal signal and noise characteristics.

Figure 16:
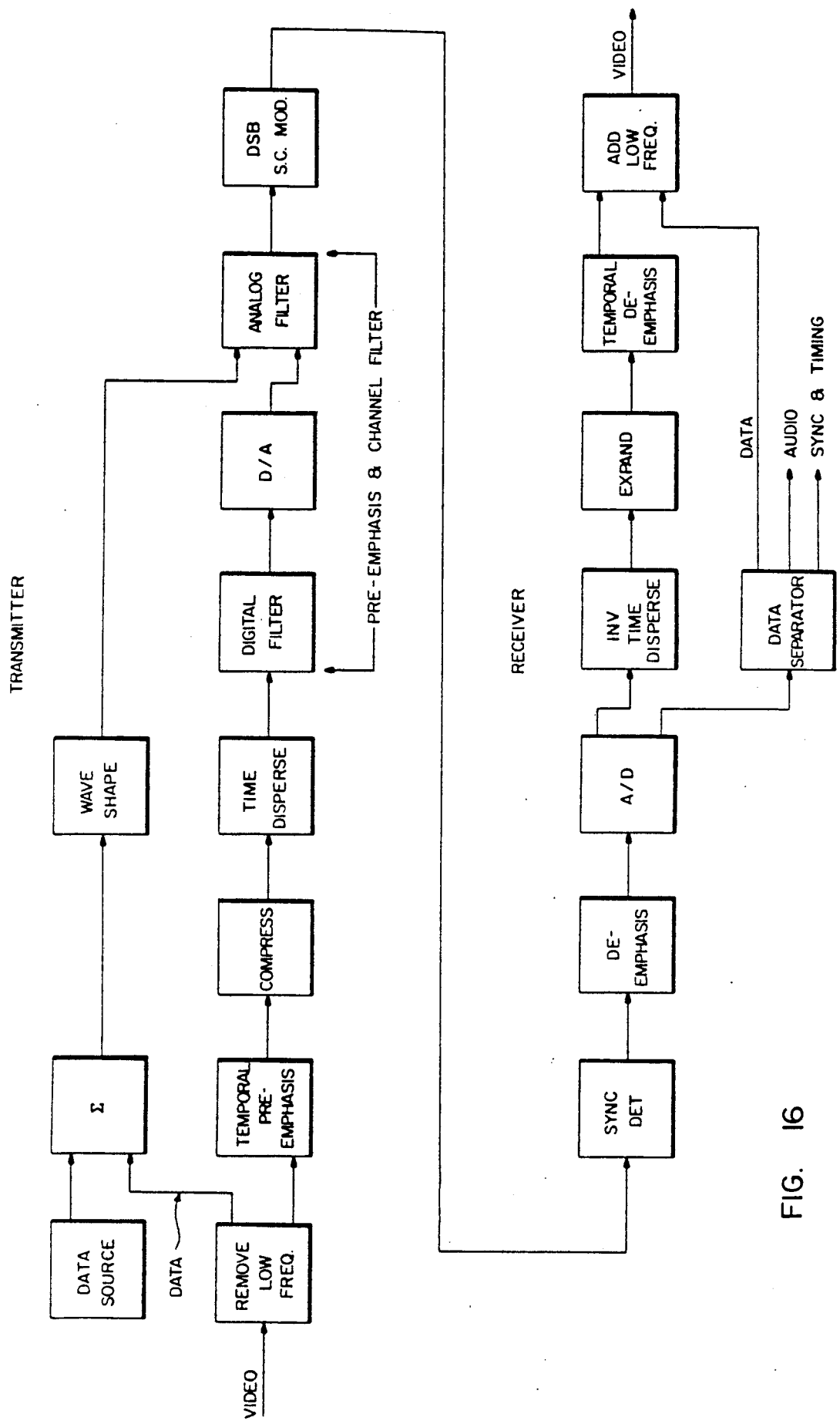
FIG. 16 is a simplified block diagram of an optimal television transmission and reception system using the principles of the invention.

In FIG. 16, such an optimal television system with minimum adjacent and co-channel interference includes a digital type transmitter having a hybrid processing stage (may be two step) to remove and digitally encode low frequency video components as data. The remaining signal comprising digitized high frequency components is subjected to temporal pre-emphasis for emphasizing the changes between successive frames of video and then subjected to compression and time dispersion. The dispersed signal is subjected to pre-emphasis and channel filtering before modulation on a double sideband suppressed carrier that is centered in a 6 MHz frequency band. The pre-emphasis and channel filtering may be accomplished by applying the time dispersed signal (in digital form) to a digital filter and then D/A converting it and applying it to an analog filter which also receives the representative data (hybrid) and other data after suitable waveshaping.

The receiver incorporates a true synchronous detector, followed by a signal de-emphasis stage and an A/D converter. The digitized signal is subjected to inverse time dispersion, expansion and temporal de-emphasis to obtain the digitized high frequency component. The removed low frequencies are reconstructed from the data and the original signal recovered by adding back the removed components. The system has very attractive advantages in minimizing adjacent channel and cochannel interference. Further, the carrier frequency may be arranged to have a "precise offset" frequency relationship with co-channel NTSC (or hybrid) signals. The precise offset frequency, as is well known in the art, should be a one-third or one-half multiple of the horizontal scan rate and a one-half multiple of the vertical scan rate. The effect of this precision offset is to break up sections of video, corresponding to DC, into lines of video (at about 10 KHz) which is visually much less perceptible on a television screen. Thus, a co-channel video display would be significantly broken up and thereby rendered much less noticeable. With temporal pre-emphasis in the transmitter and temporal de-emphasis in the receiver, and with the two carriers offset by an odd multiple of one-half the frame rate, such that carrier components of the co-channel fall within the troughs or minimum response points of the receiver temporal filter, (See FIG. 18) the visibility of co-channel interference in the receiver is significantly reduced. The hybrid signal should also be frame locked to the NTSC co-channel to assure that the data portions of the hybrid processed signal (data is sent in the vertical blanking intervals) do not occur during video portions of the NTSC co-channel. In the copending application referred to above, the transmitted signal has no sync which further reduces the peak signal excursions and said co-channel performance.

In FIG. 17, temporal pre-emphasis in the transmitter is illustrated. The video input signal is subjected to a delay of T (one frame delay), multiplied by a factor "a" (less than one) and subtracted from the undelayed signal. Its impulse response and frequency response are shown. The opposite action occurs in the receiver as illustrated in FIG. 18 where the input signal is subjected to a delay of T, multiplied by the same amplification factor "a" and fed back to the signal.

Frame combing has been used in the prior art for separation of color signals. The benefit of frame combing or temporal filtering has not been recognized in encoding video signals for reduced power transmission. Its use in a hybrid television signal system reduces transmission power for static images and thereby helps to reduce interference of the hybrid signal into an NTSC co-channel and also to minimize co-channel interference from an NTSC channel into a hybrid signal receiver. The temporal pre-emphasis filter response for static images (zero temporal frequency) is at a minimum while its response for frequencies equal to T/2 is at a maximum. As shown, the response for static images is reduced to a 1-a and, at one-half the frame rate is increased. These numbers are of course a function of the actual filter design. Thus, the video signal corresponding to a static image is reduced significantly. Since most television pictures are relatively static, the overall interference into an NTSC co-channel will be reduced. For video motion, the interference into the NTSC co-channel, while not reduced, will be much less noticeable because fast moving video images (very small width moving edges) are difficult for the human eye to resolve.

The complementary receiver temporal de-emphasis filter in FIG. 18 has the opposite effect and is an infinite impulse response filter with a single pole which cancels the zero in the corresponding filter of the transmitter. The combined frequency response of the transmitter temporal filter and receiver temporal filter is flat. The response of the receiver temporal filter at zero temporal frequency (static input) is at a maximum while the response for moving images is at a minimum. In practicing the precision offset mentioned above, the static portions of the NTSC co-channel interference can be made to appear as one-half frame rate temporal frequency components, falling into the troughs of the receiver filter response and thereby being reduced significantly.

Signal pre-emphasis and de-emphasis may be used to help improve the noise performance of the hybrid signal. Circuitry therefor is not illustrated since it involves well known boosting of the high frequencies during transmission and reducing or rolling off the boosted high frequencies in the receiver. The receiver filter may have a haystack shape and sharply discriminate against adjacent channel frequencies.

A compander compressor is illustrated in FIG. 19 and a compander expander is illustrated in FIG. 20. Companding (that is compressing and expanding) improves interference performance both to and from an NTSC co-channel. This is so, since with hybrid processing, high signal amplitudes only occur during transitions, such as on video edges or in video detail. (With temporal pre-emphasis, high signal amplitudes only occur on moving edges.) As seen in FIG. 19, the compressor has a non-linear transfer characteristic that raises the level of low amplitude signals and lowers the level of high amplitude signals. By reducing the amplitude of the highest amplitude signals, the signal peaks that cause co-channel interference are reduced. The low amplitude signals are increased, but they are not the peak signals that are responsible for co-channel interference. In the receiver, the expander transfer characteristic is complementary (see FIG. 20), so that the overall effect on the signal is flat. The expander, it will be noted, also serves to reduce interference from the NTSC co-channel into the hybrid signal channel. The NTSC co-channel will, under the worst conditions, be a low amplitude signal and the hybrid signal exhibits high amplitudes only during video movement and for video detail. The hybrid receive a signal that will be a sum of the low amplitude co-channel and the hybrid signal. In areas of low detail, where the co-channel interference will be most visible, the combined signal levels of the co-channel and hybrid signal will still be small and the expander will further reduce that by the inverse of the amplification factor of the compressor. Thus, the most visible interfering signals are reduced. During moving video and video detail in the hybrid signal, where the co-channel is least visible, the combined levels of the co-channel and hybrid signal is high and will be further increased by the expander characteristic. The result is that the co-channel interference is shifted from low video detail (flat, stationary) areas to high detail and moving areas where it is much less visible. Noise is also processed as co-channel interference and therefore the same improvement is obtained with respect to noise performance. The compression process may create distortion products in the video signal which can be compensated for by suitable peaking.

The transmission systems and methods described are not to be considered limiting of the broad aspects of the invention. It is recognized that numerous modifications in the described embodiments of the invention may be made by those skilled in the art without departure from its true spirit and scope. The invention is to be limited only as defined in the claims.

What is claimed is:

1. A hybrid analog-digital method of operating a television signal transmission system comprising:
    developing a first analog signal comprising predominantly high frequency components of a baseband video signal;
    developing a digitally coded representation of a second signal comprising predominantly low frequency components of said baseband video signal; and
    transmitting said first analog signal and said digitally coded representation.

2. The method of claim 1, further including the step of incorporating said digitally coded representation as data in said first analog signal.

3. The method of claim 2 wherein said second signal is representative of the line averaged value of the active video portion of each horizontal line in said baseband video signal and wherein said first analog signal is the difference between said second signal and said baseband video signal.

4. The method of claim 3, wherein said baseband video signal includes non-active video portions and wherein said data is included in said non-active video portions.

5. The method of claim 4, further including the steps of generating digital values corresponding to the line averaged values of each of said horizontal lines to form said data; and
    developing said first analog signal by converting said digital values into analog signals that are algebraically combined with said baseband video signal.

6. The method of claim 5 wherein said digital values have a predetermined resolution that leaves a relatively small residue of said low frequency components in said first analog signal.

7. A method of operating a television signal transmission system comprising the steps of:
    developing a predominantly high frequency components video signal from a composite baseband video signal by subtracting a signal indicative of the low frequency components of said composite baseband video signal;
    developing a digitally coded representation of said low frequency components indicative signal; and
    transmitting said high frequency components video signal and said digitally coded representation.

8. The method of claim 7 wherein said low frequency components indicative signal comprises the average value of the active video portion of each horizontal line of said composite baseband video signal and wherein said digitally coded representation is in the form of digital data, and further including the step of:
    incorporating said digital data in non-active video portions of said high frequency components video signal.

9. The method of claim 8 wherein said composite baseband video signal includes horizontal blanking intervals and wherein said digital data is inserted in said horizontal blanking intervals.

10. The method of claim 9, further including the step of delaying said composite baseband video signal by one horizontal line prior to subtracting said low frequency components indicative signal.

11. The method of claim 10 wherein said digital data comprises the digital value of said low frequency components indicative signal, and further including the step of:
    generating an analog signal from said digital value and subtracting it from said composite baseband video signal to form said high frequency components video signal.

12. A television signal transmission system comprising:
    means producing a baseband video signal;
    means developing a low frequency components signal indicate of the line averaged value of active video in said baseband video signal;
    means combining said low frequency components signal with said baseband video signal to develop a high frequency components signal;
    means developing a digitally coded representation of said low frequency components signal; and
    means for modulating a carrier with said high frequency components signal and said digitally coded representation for transmission.

13. The system of claim 12, further including:
    line integrating means for developing said line averaged value of active video in said baseband video signal; and analog-to-digital converter means coupled to said integrating means for developing said digitally coded representation.

14. The system of claim 13, further including:
delay means for delaying said baseband video signal by one horizontal line; and
digital-to-analog converter means coupled to said analog-to-digital converter means for developing said low frequency components signal for combining with said baseband video signal.

15. The system of claim 12 wherein said baseband video signal is in digital form, and further including:
means for determining the average digital value of the active video portion of each horizontal line of said digital baseband video signal;
means for combining said average digital values with said digital baseband video signal to develop a digital high frequency components signal; and
means for incorporating said average digital values as data in said digital high frequency components signal.

16. The system of claim 15, further including a digital-to-analog converter for converting said high frequency components digital signal and digital data into an analog signal for transmission.

17. A receiver for receiving a television signal including high frequency components of a video signal and a digitally coded representation of low frequency components of said video signal, comprising:
means for generating an additional signal from said digitally coded representation; and
means for combining said high frequency components with said additional signal to reconstruct said video signal.

18. The receiver of claim 17 wherein said digitally coded representation is of limited resolution and wherein said additional signal has the same limited resolution.

19. The receiver of claim 18 further including digital-to-analog converter means for converting said digitally coded representation into said additional signal.

20. The receiver of claim 19 wherein said television signal includes a reference signal, and further including means for detecting said reference signal and controlling the gain of said receiver as a function thereof.

21. A television signal transmission method comprising:
developing a first signal representing the frequency components of the television signal below the horizontal scanning frequency thereof;
developing a second signal representing the remaining frequency component of the television signal; and
transmitting the first and second signals in different formats, the format for the first signal comprising a coded relatively low power utilization format including a digitally coded representation of said low frequency components signal.

22. A television signal transmission method comprising:
developing first and second signals, respectively comprising frequency components of the television signal utilizing relatively low and high transmission power levels;
digitally encoding the second signal for transmission in a relatively low power utilization format; and
transmitting the first and digitally coded second signals.

23. A television signal transmission method comprisign:
developing a first signal representing frequency component of the television signal having a relatively low picture detail content and a relatively high transmission power demand;
developing a second signal representing frequency components of the television signal having a relatively high picture detail content and a relatively low transmission power demand;
digitally coding the first signal for transmission in a relatively low power utilization format; and
transmitting the second and digitally coded first signals.

24. A television transmission and reception system comprising:
at a transmitter:
means for developing a first signal comprising predominantly high frequency components of a baseband video signal;
means for developing from a second signal comprising predominantly low frequency components of said baseband video signal a limited resolution digitally coded representation thereof; and
means for transmitting said first signal and said digitally coded representation; at a receiver:
means for receiving said first signal and said limited resolution digitally coded representation;
means for regenerating said second signal from said limited resolution digitally coded representation; and
means for combining said first signal and said second signal to reconstruct said baseband video signal.

25. The system of claim 24 wherein said limited resolution digitally coded representation is a digital value of a given number of bits.

26. The system of claim 25 wherein said second signal represents the lien averaged value of the active video of each horizontal line in said baseband video signal and wherein said first signal is the difference between said baseband video signal and said second signal.

27. A method of operating a television signal transmission system comprising the steps of:
developing a first signal comprising predominantly high frequency components of a baseband video signal;
developing a digitally coded representation of a second signal comprising predominantly low frequency components of said baseband video signal such that the power required to transmit the coded low frequency components is very substantially less than the power required to transmit the same frequencies in uncoded form; and
transmitting said first signal and said digitally coded representation.

28. A method of operating a television signal transmission system comprising the steps of:
developing a first signal comprising predominantly high frequency components of a baseband video signal;
developing a digitally coded representation of a second signal comprising predominantly low frequency components of said baseband video signal; and
transmitting said first signal and said digitally coded representation such that said digitally coded representation is transmitted with a small fraction of the total transmitted signal power.

29. A hybrid analog-digital television signal transmission and reception method comprising:
developing a first analog signal comprising a first band of frequency components of a baseband video signal;
developing a digitally coded representation of a second signal comprising a second band of frequency components of said baseband video signal;
transmitting said first analog signal and said digitally coded representation of said second signal;
receiving said first analog signal and said digitally coded representation of said second signal; and
regenerating said second signal and combining the resulting signal with said first analog signal.

30. The method of claim 29, further including the step of incorporating said digitally coded representation as data in said first analog signal.

31. The method of claim 30 wherein said second signal is representative of the line averaged value of the active video portion of each horizontal line in said baseband video signal and wherein said first analog signal is the difference between said second signal and said baseband video signal.

32. The method of claim 32, wherein said baseband video signal includes non-active video portions and wherein said data is included in said non-active video portions.

33. The method of claim 29, further including generating digital values corresponding to the line averaged values of each of said horizontal lines to form said data; and
developing said first analog signal by converting said digital values into analog signals that are algebraically combined with said baseband video signal.

34. The method of claim 33 wherein said digital values have a predetermined resolution that leaves a relatively small residue of said low frequency components in said first analog signal.

35. A hybrid analog-digital receiver for receiving a television signal including analog high frequency components of a video signal and a digitally coded representation of low frequency components of said video signal, comprising:
means for generating an additional signal from said digitally coded representation; and
means for combining said analog high frequency components with said additional signal to reconstruct said video signal.

36. The receiver of claim 35 wherein said digitally coded representation is of limited resolution and wherein said additional signal has the same limited resolution.

37. The receiver of claim 35 further including digital-to-analog converter means for converting said digitally coded representation into said additional signal.

38. The receiver of claim 37 wherein said television signal includes a reference signal, and further including means for detecting said reference signal and controlling the gain of said receiver as a function thereof.

39. A television signal transmission and reception method comprising;
developing a first signal representing higher frequency components of a television signal;
developing a second signal representing low frequency components of the television signal below the horizontal scanning frequency thereof;
transmitting the first and second signals in different formats the format for the second signal comprising a coded relatively low power utilization format including a digitally coded representation of said low frequency components;
receiving said first and second signals; and
decoding said digitally coded representation and combining the result with said first signal.

40. A television signal transmission and reception method comprising;
developing analog first and digital second signals, respectively comprising frequency components of the television signal utilizing the relatively low and high transmission power levels;
digitally coding the second signal for transmission in a relatively low power utilization format;
transmitting the first and digitally coded second signals;
receiving said first and second signals; and
decoding said digitally coded representation and combing the result with said first signal.

41. A hybrid analog-digital television signal transmission and reception method comprising:
developing a first signal representing frequency components of the television signal having a relatively low picture detail content an a relatively high transmission power demand;
developing a second analog signal representing frequency components of the television signal having a relatively high picture detail content and a relatively low transmission power demand;
digitally coding the first signal for transmission in a relatively low power utilization format;
transmitting the analog second and digitally coded first signals;
receiving said firs and second signals; and
decoding said first signal and combining the result with said second signal.

42. A method of processing a television signal for transmission at drastically reduced power levels, comprising:
removing from the television signal at least a portion of the energy in selected frequency components of the signal which represent low picture detail, said selected frequency components constituting a small part of the overall television signal bandwidth, but containing a majority of the overall television signal energy;
developing a digital signal representing a digital encoding of the selected frequency components; and
developing an analog second signal representing other frequency components of the television signal which represent high picture detail.

43. The method defined by claim 42 wherein said selected frequency components having a bandwidth on the order of hundreds of kiloHertz.

44. A hybrid digital-analog method of transmitting and receiving an information signal, comprising:
removing from the information signal at least a portion of the energy in selected frequency components of the signal requiring relatively high transmission power;
developing a digital signal representing a digital encoding of the selected frequency components;
transmitting the information signal in analog form;
transmitting the digital signal characterizing the selected frequency components;

receiving the analog information signal and the digital signal; and decoding the digital signal and combining it with the analog information signal.

45. The method defined by claim 44 wherein said selected frequency components having a bandwidth on the order of hundreds of kiloHertz.

46. A method of transmitting and receiving a television signal at significantly reduced average power levels, comprising:

removing from the television signal at least a portion of the energy in selected frequency components of the signal which represent low picture detail, said selected frequency components constituting a small part of the overall television signal bandwidth, but containing a majority of the overall television signal energy and requiring relatively high transmission power;

developing a digital signal representing a digital encoding of the selected frequency components;

transmitting a second signal representing other frequency components of the television signal which represent high picture detail;

transmitting the digital signal characterizing the selected frequency components;

receiving the second signal and the digital signal; and combining the digital signal with the second signal.

47. The method defined by claim 46 wherein said digital signal is transmitted during inactive portions of the television signal.

48. The method defined by claim 46 wherein said selected frequency components has a bandwidth on the order of hundreds of kiloHertz.

49. A method of transmitting and receiving a television signal at drastically reduced average power levels, comprising:

removing from the television signal at least a portion of the energy in selected frequency components of the signal which represent low picture detail, said selected frequency component constituting a small part of the overall television signal bandwidth, but containing a majority of the overall television signal energy and normally requiring relatively high transmission power;

developing a digital signal representing a digital encoding of the selected frequency components;

transmitting a second signal representing other frequency components of the television signal which represent high picture detail;

transmitting the digital signal characterizing the selected frequency components at very low average power levels compared to the average power required to transmit said selected frequency components in analog form and to the overall transmitted signal power;

receiving the second signal and the digital signal; and combining the digital signal with the second signal.

50. The method described by claim 49 wherein said digital signal is transmitted during inactive portions of the television signal.

51. The method defined by claim 49 wherein said selected frequency components having a bandwidth on the order of hundreds of kiloHertz.

52. A hybrid digital-analog method of transmitting and receiving an analog television signal at drastically reduced average power levels, comprising:

removing from the television signal at least a portion of the energy in selected frequency components of the signal which represent low picture detail, said selected frequency components constituting a small part of the overall television signal bandwidth, but containing a majority of the overall television signal energy and normally required relatively high transmission power;

developing a digital signal representing a digital encoding of the selected frequency components;

transmitting in an analog form a second signal representing other frequency components of the television signal which represent high picture detail;

transmitting the digital signal characterizing the selected frequency components at very low average power levels compared to the average power required to transmit said selected frequency components in analog form and to the overall transmitted signal power;

receiving the analog second signal and the digital signal; and converting the digital signal to analog form and combining it with the analog second signal.

53. A method of processing an analog information signal from which has been removed at lest a portion of the energy in selected frequency components requiring relatively high transmission power, the removed selected frequency components being included in the analog information signal as a digitally encoded representation, said method comprising:

receiving the analog information signal and the digitally encoded representation;

decoding the digitally encoded representation; and combining the decoded representation with the analog information signal.

54. The method defined by claim 53 wherein said analog information signal has a bandwidth in magaHertz, and wherein said selected frequency components have a bandwidth on the order of hundreds of kiloHertz.

55. A method of processing a television signal from which has been removed at lest a portion of the energy in selected frequency components representing low picture detail to provide an analog television signal, the selected frequency components constituting a small part of the overall television signal bandwidth, but containing a majority of the overall television signal energy, the removed selected frequency components being included in the analog television signal as a digitally encoded representation, said method comprising:

receiving the analog television signal and the digitally encoded representation of the selected frequency components removed from the television signal;

decoding the digitally encoded representation; and combining the representation with the analog television signal.

56. The method defined by claim 55 wherein said digitally encoded representation occupies inactive portions of the television signal.

57. The method defined by claim 55 wherein said selected frequency components having a bandwidth on the order of hundreds of kiloHertz.

* * * * *